(12) United States Patent
Mackin et al.

(10) Patent No.: US 11,186,362 B2
(45) Date of Patent: Nov. 30, 2021

(54) BRAKE SYSTEMS FOR AIRCRAFT AND RELATED METHODS

(71) Applicant: The Boeing Company, Chicago, IL (US)

(72) Inventors: Steve G. Mackin, Bellevue, WA (US); Christopher T. Jasklowski, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 337 days.

(21) Appl. No.: 16/222,633

(22) Filed: Dec. 17, 2018

(65) Prior Publication Data

US 2020/0189728 A1 Jun. 18, 2020

(51) Int. Cl.
*B64C 25/42* (2006.01)
*B60T 1/14* (2006.01)
*B64D 29/06* (2006.01)
*B64D 17/80* (2006.01)

(52) U.S. Cl.
CPC .............. *B64C 25/42* (2013.01); *B64D 17/80* (2013.01); *B64D 29/06* (2013.01); *B60T 1/14* (2013.01)

(58) Field of Classification Search
CPC ........ B64C 25/42; B64D 17/80; B64D 29/06; B60T 1/14; B60T 8/325; F16D 63/008
See application file for complete search history.

(56) References Cited

U.S. PATENT DOCUMENTS

| | | | | |
|---|---|---|---|---|
| 3,062,327 | A * | 11/1962 | Debus | B62D 55/02 188/5 |
| 5,054,998 | A * | 10/1991 | Davenport | B64D 33/04 416/1 |
| 8,356,685 | B2 * | 1/2013 | Baumann | B60T 1/14 180/164 |
| 9,284,061 | B2 | 3/2016 | Kutzmann | |
| 9,487,190 | B1 * | 11/2016 | Alvarado | B60T 1/14 |
| 9,656,638 | B2 * | 5/2017 | Rydsmo | F16D 63/008 |
| 2014/0191078 | A1 * | 7/2014 | Boren | B64C 25/68 244/13 |
| 2017/0008497 | A1 * | 1/2017 | Svensson | B60T 1/14 |
| 2017/0015287 | A1 * | 1/2017 | Sander | B60T 8/56 |

FOREIGN PATENT DOCUMENTS

DE 10009879 C1 * 8/2001 ............... B60T 1/14

* cited by examiner

*Primary Examiner* — Joshua J Michener
*Assistant Examiner* — Colin Zohoori
(74) *Attorney, Agent, or Firm* — Hanley, Flight & Zimmerman, LLC

(57) ABSTRACT

Braking systems for aircraft are disclosed. An example braking system includes a brake pad movably coupled to a lower section of a fuselage of the aircraft. The brake pad is movable between a stowed position and a deployed position. An actuator is configured to deploy the brake pad from the fuselage during an emergency braking event. The brake pad to engage a surface of a runway and increase frictional force to reduce a speed of the aircraft during the emergency braking event.

20 Claims, 26 Drawing Sheets

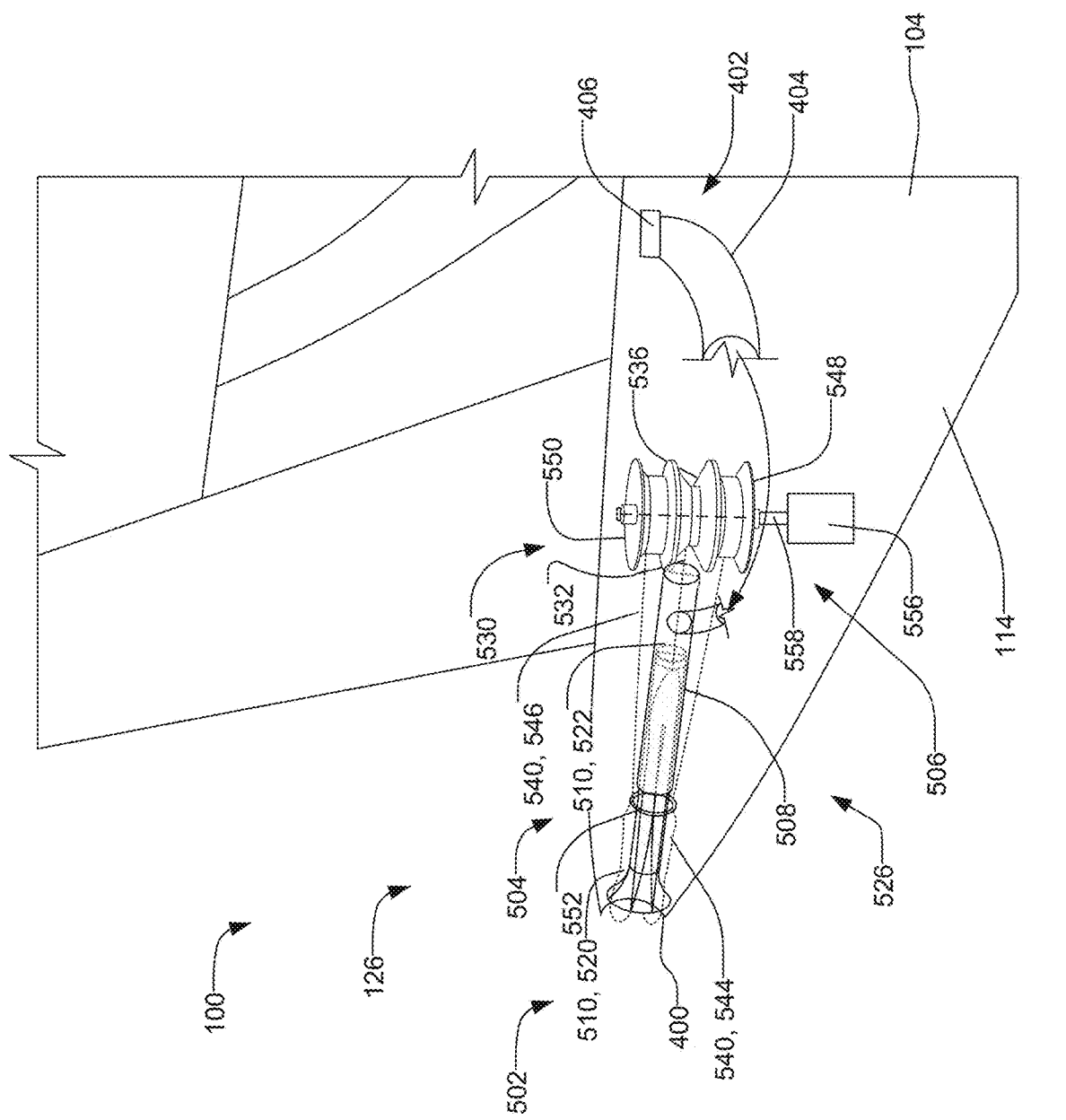

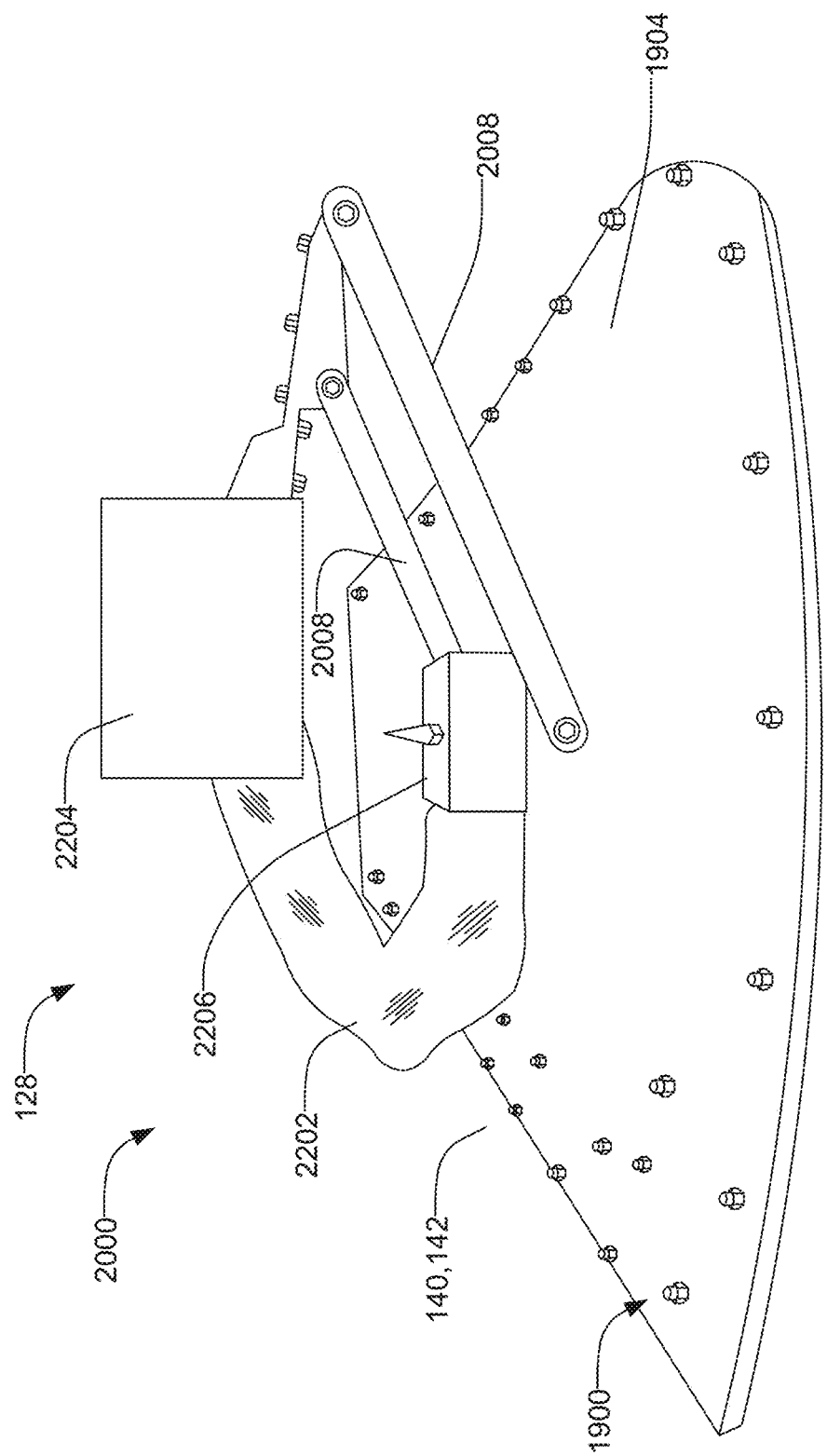

BRAKE SYSTEMS FOR AIRCRAFT AND RELATED METHODS

FIELD OF THE DISCLOSURE

This disclosure relates generally to aircraft and, more specifically, to brake systems for aircraft and related methods.

BACKGROUND

Aircraft employ a variety of methods to perform braking operations during a landing event. For example, aircraft employ wheel brakes. Additional braking systems can be used in combination with or to supplement the wheel brakes. For example, aircraft employ adjustable flaps called speed brakes or spoilers located on the wings to provide an impedance to airflow to aid in deceleration. In some instances, aircraft employ thrust reversers that function to reverse airflow to provide reverse thrust during a landing event. While thrust reversers are effective in supplementing the wheel braking systems, thrust reversers are complex systems that typically include cascade baskets, blocker doors, drag links, translation and actuation systems, etc. As such, thrust reversers are relatively expensive systems to manufacture and maintain. Thrust reversers also increase nacelle weight, which decreases aircraft fuel efficiency.

BRIEF DESCRIPTION OF THE DRAWINGS

FIG. 5B is perspective, partial view of the example aircraft of FIGS. 1, 4A and 4B showing the example parachute system in an example stowed position.

FIG. 22 is a perspective, partial view of an example frame of the example emergency brake system of FIGS. 19-21.

Figure 1:
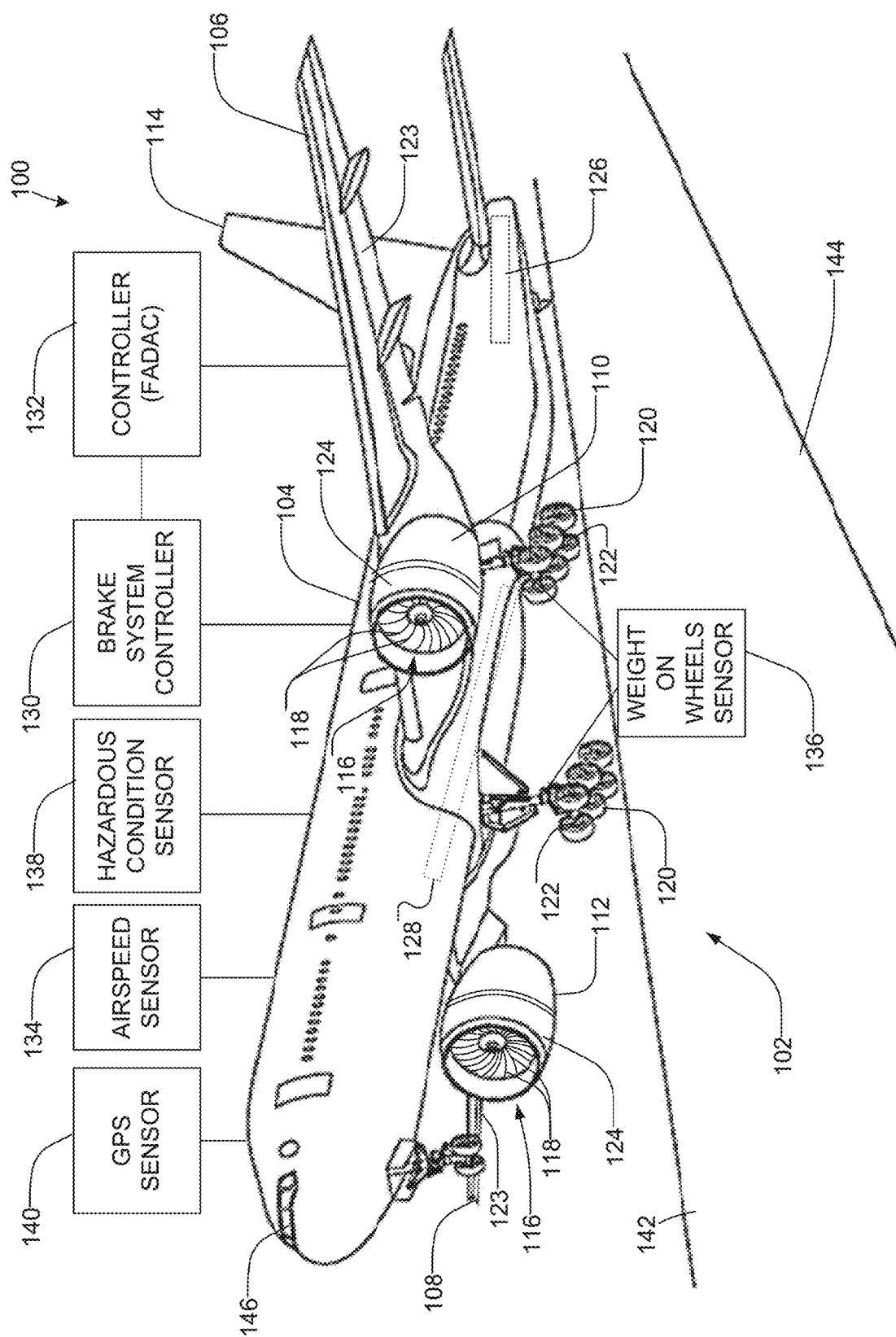
FIG. 1 is a perspective view of an example aircraft having example brake system constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. Additionally, several examples have been described throughout this specification. Any features from any example can be included with, a replacement for, or otherwise combined with other features from other examples. In other words, the example disclosed herein are not mutually exclusive to each other. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located between the part. Stating that any part is in contact with another part means that there is no intermediate part between the two parts.

DETAILED DESCRIPTION

In known aircraft, thrust reversers are often used to decrease braking distance on a runway. However, thrust reversers require throttling the engines to create reverse thrust. Such throttling increases engine wear and tear. Additionally, thrust reversers often reduce braking capability because some of the reverse thrust creates lift. In some instances, thrust reversers may not be effective (e.g., may not be deployed quickly enough) to stop an aircraft if a collision with an object is imminent. Typically, thrust reversers cannot create 4-5 G-force of negative thrust and/or thrust reversers cannot be deployed below a certain speed.

Example braking systems disclosed herein can supplement, or can be used in combination with, wheel brakes of an aircraft. Specifically, example braking systems disclosed herein enable deceleration of an aircraft during landing without the use of thrust reversers. Thus, example braking systems disclosed herein can significantly reduce complexity and weight of aircraft engines (e.g., by eliminating thrust reversers).

In some examples, example braking systems disclosed herein employ air brakes implemented with an aircraft engine. To provide deceleration during landing, examples disclosed herein employ aircraft engines that include air brakes. The air brakes can be provided by adjustable surfaces (e.g., doors) to provide impedance to airflow to aid in deceleration of the aircraft. For example, air brakes can be provided via fan cowl surfaces (e.g., doors) during landing. For example, portions of a fan cowling that also function as access doors to maintain a fan of the aircraft can be hinged from side surfaces instead of a top surface. In this manner, the fan cowl doors extend into (e.g., perpendicular relative to) an airflow stream to also function as an air brake to provide at least a portion of a braking force needed to reduce a speed of the aircraft during landing. Known fan cowls are typically hinged at an upper edge such that the cowl rotates upwardly relative to the aircraft engine to access the fan (e.g., during maintenance). In contrast to known fan cowls, example aircraft engines disclosed herein employ fan cowls that rotate outwardly relative to the center axis of the aircraft engine (i.e. the cowl opens from a side). Specifically, an example fan cowl disclosed herein rotates relative to an aircraft engine about a pivot axis aligned or adjacent a leading edge of the fan cowl. For example, the pivot axis is non-parallel to (e.g., perpendicular to) a longitudinal axis of the aircraft engine.

In some examples, to provide deceleration during landing, example braking systems disclosed herein includes a deployable parachute. Additionally, example braking systems disclosed herein enable recovery of the parachute for subsequent use. For instance, in contrast to known parachute systems, example braking systems disclosed herein employ a parachute retrieval system configured to recover the parachute from the deployed position to a stowed position for subsequent use. Example parachute retrieval systems automatically recover a deployed parachute and automatically fold the parachute for subsequent use. For example, the braking systems employ a reel system to retrieve and repackage a deployed parachute or umbrella in a launch tube for subsequent use.

In some examples, braking systems disclosed herein provide deployable emergency brakes for use during a landing event or failed take-off event that requires rapid deceleration of the aircraft. The emergency brakes include a brake pad deployable from an aircraft that engages a runway or ground surface to help stop the aircraft. Example emergency brake systems disclosed herein prevent or reduce runway excursions. In some examples, the emergency brake systems disclosed herein detect potential collisions with other objects (e.g., other aircraft) and deploy an emergency brake to stop the aircraft if possible, or greatly reduce a speed at impact with the detected object. Thus, the braking capability of the system prevents or reduces the impact of runway collisions. In some examples, emergency brakes disclosed herein can generate between approximately 4 and 5 G of braking force during a rejected takeoff and/or emergency landing. In some examples, the emergency brake systems disclosed herein reduce risk of fire due to overheated brakes. Additionally, emergency brake systems disclosed herein can increase a weight on wheels during a rejected takeoff.

FIG. 1 is a perspective view of an aircraft 100 having an example braking system 102 in accordance with teachings of this disclosure. The aircraft 100 of the illustrated example is a commercial aircraft. However, the braking system 102 can be implemented with other aircraft, spacecraft or vehicles without departing from the scope of this disclosure. In some examples, the brake system 102 can be implemented with any other example aircraft such as, for example, military aircraft, transport aircraft and/or any other aircraft.

The aircraft 100 of the illustrated example includes a fuselage 104, wings 106, 108, aircraft engines 110, 112 supported by the respective wings 106, 108, and an empennage 114. The aircraft engines 110, 112 of the illustrated do not employ thrust reversers. To provide reverse thrust during landing, each of the aircraft engines 110, 112 includes a variable pitch fan 116 (e.g., a variable pitch gear driven fan) driven by a core (e.g., a compressor or turbine) of the respective aircraft engines 110, 112. The variable pitch fan 116 includes fan blades 118 having a pitch that can be varied during landing to provide reverse thrust needed to slow or stop the aircraft 100. In some examples, the variable pitch fan 116 serves as a primary means of slowing or decelerating the aircraft 100. Additionally, the aircraft 100 includes wheels 120 that have wheel brakes 122 to decelerate and/or stop the aircraft 100 during landing. To further improve deceleration during landing, the wings 106, 108 of the illustrated example include one or more flaps 123 (e.g., speed brakes or spoilers) that rotate into an airflow path to impede airflow and function as air brakes during landing.

To supplement the variable pitch fan 116 and/or the wheel brakes 122 during landing, the aircraft 100 of the illustrated example employs the brake system 102. The brake system 102 of the illustrated example includes an air brake system 124 and a parachute system 126. Additionally, to provide rapid deceleration of the aircraft 100 during emergency situations, the brake system 102 of the illustrated example includes an emergency brake system 128. Thus, the aircraft 100 of the illustrated example includes the air brake system 124, the parachute system 126 and the emergency brake system 128. It should be understood that it is not necessary for an aircraft or a braking system to include all of the air brake system 124, the parachute system 126, and the emergency brake system 128. For example, the aircraft 100 can include one or any combination of the air brake system 124, the parachute system 126, or the emergency brake system 128. In some examples, the aircraft 100 can include the air brake system 124 without the parachute system 126 and/or the emergency brake system 128. In some examples, the aircraft 100 can include the parachute system 126 without the air brake system 124 and/or the emergency brake system 128. In some examples, the aircraft 100 can include the emergency brake system 128 without the air brake system 124 and/or the parachute system 126.

The brake system 102 of the illustrated example is configured to deploy or activate during landing without pilot input. To deploy the brake system 102 of the illustrated example, the brake system 102 includes a brake system controller 130. The brake system controller 130 can be communicatively coupled to an engine control system 132 (e.g., a Full Authority Digital Engine Controller (FADEC).

In some examples, the brake system controller 130 and/or the engine control system 132 receives multiple input variables corresponding to current flight conditions including, for example, altitude, air speed, angle of attack, throttle lever position, air pressure, air temperature, and/or other parameter(s). In addition, some of the input variables (e.g., air density) are calculated or determined based on other measured conditions or parameter(s).

To receive flight parameters, the aircraft 100 of the illustrated example includes an airspeed sensor 134, a weight on wheels sensor 136, a hazardous condition sensor 138, and a global positioning system (GPS) sensor 140. The airspeed sensor 134 provides information to the brake system controller 130 and/or the engine control system 132 to determine the speed of the aircraft 100. For example, the airspeed sensor 134 can include a pitot tube, Laser Imaging, Detection And Ranging (LIDAR) sensor(s), and/or any other sensor(s) to detect or determine a speed of the aircraft 100. The weight on wheels sensor 136 provides information to the brake system controller 130 and/or the engine control system 132 to determine whether the aircraft 100 is on the ground or in flight. For example, the weight on wheels sensor 136 can be a pressure sensor and/or any other sensor to detect when the wheels 120 of the aircraft 100 engage a surface 142 of a runway 144. The GPS sensor 140 provides information to the brake system controller 130 and/or the engine control system 132 to determine a location of the aircraft 100 relative to a reference. The hazardous condition sensor 138 provides information to the brake system controller 130 and/or the engine control system 132 to determine if a hazardous condition is present during a landing or takeoff event. For example, the hazardous condition sensor 138 includes one or more laser sensors (e.g., LIDAR sensors), optical sensors, proximity sensors, sonar sensors and/or any other sensors to image objects and/or the environment surrounding the aircraft 100. For example, the hazardous condition sensor 138 can detect an object (e.g., an aircraft, etc.) in a pathway of the aircraft 100 and/or can detect a terminating end of a runway on which the aircraft 100 is preparing to take-off. The brake system controller 130 receives the information from the various sensors 134, 136, 138, 140 and/or the engine control system 132 to determine and/or control the deployment of the air brake system 124, the parachute system 126 and/or the emergency brake system 128.

In some examples, the brake system 102 can be deployed manually. In some examples, a pilot, co-pilot, or other flight crew member(s) manually deploys the air brake system 124, the parachute system 126 and/or the emergency brake system 128. For example, the brake system 102 (e.g., the air brake system 124, the parachute system 126, and/or the emergency brake system 128) can deploy via a user interface (e.g., a touch screen, a button, a lever, etc.) located in a cockpit 146 of the fuselage 104. In some examples, one or more portions of the brake system 102 can deploy autonomously (e.g., without pilot input), while one or more other portions of the brake system 102 can deploy manually (e.g., via pilot input).

Figure 2A:
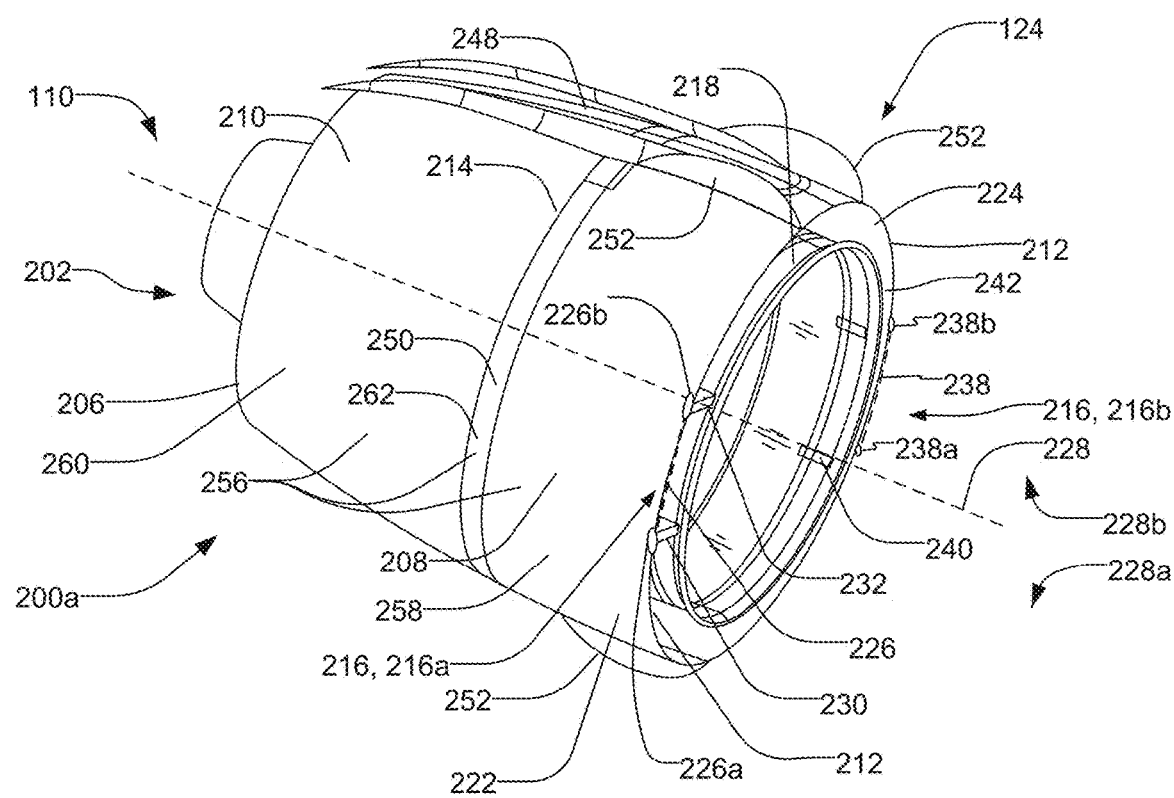
FIG. 2A is a perspective view of an example aircraft engine of FIG. 1 shown from an inboard side of the aircraft engine and showing an example air brake system in an example stowed position.
Figure 2B:
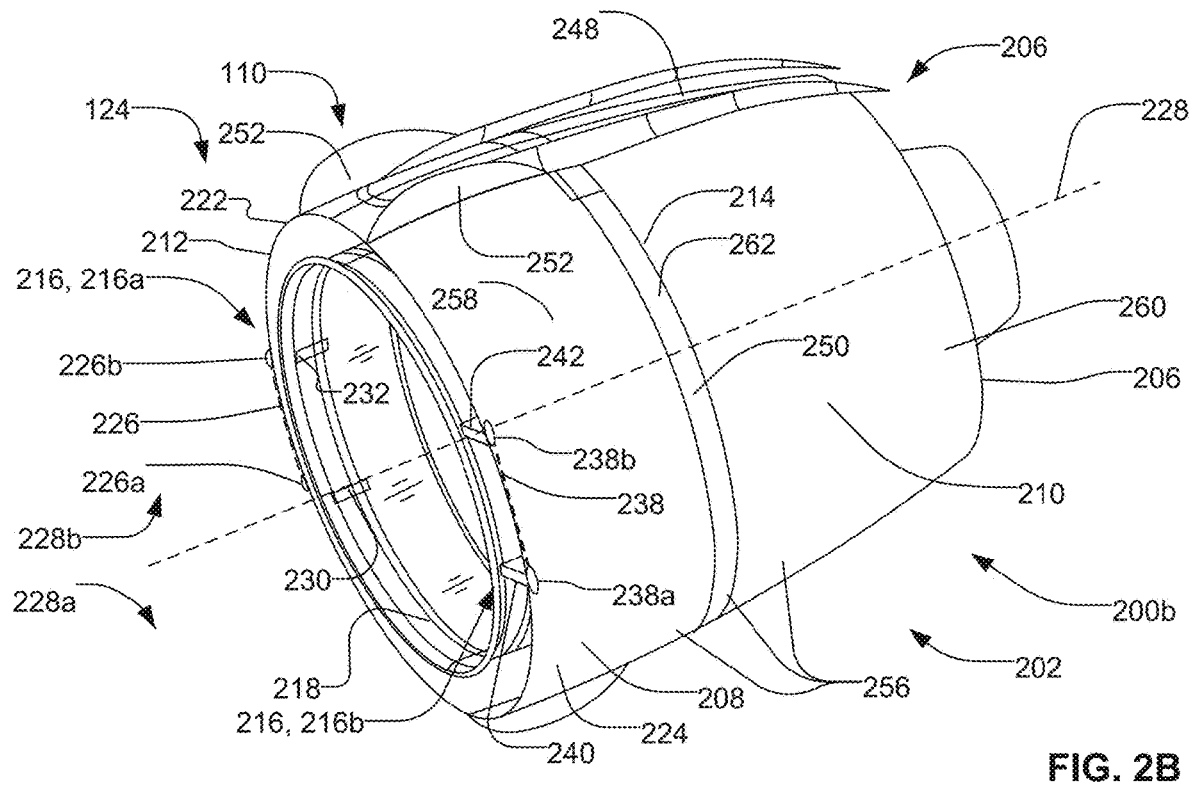
FIG. 2B is a perspective view of an example aircraft engine of FIGS. 1 and 2A shown from an outboard side of the aircraft engine.
Figure 2C:
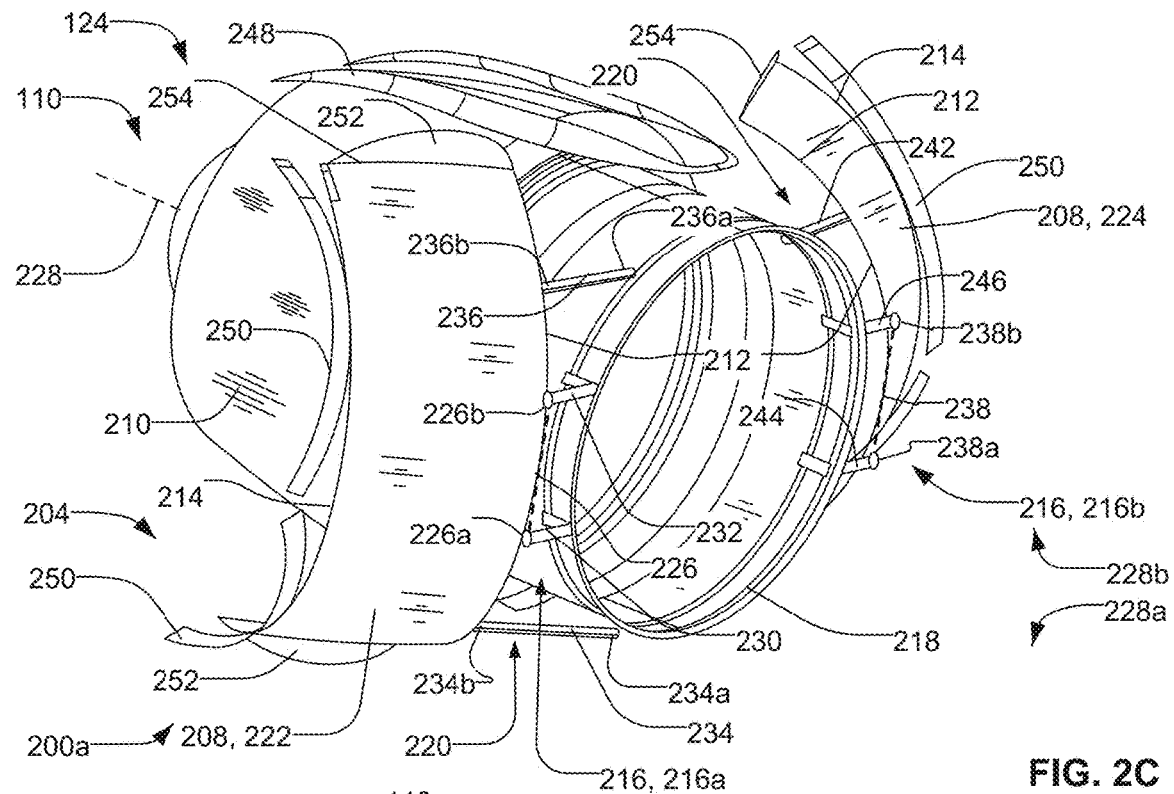
FIG. 2C is a perspective view of the example aircraft engine of FIG. 1 shown from the inboard side of the aircraft engine and showing the example air brake system in an example deployed position.
Figure 2D:
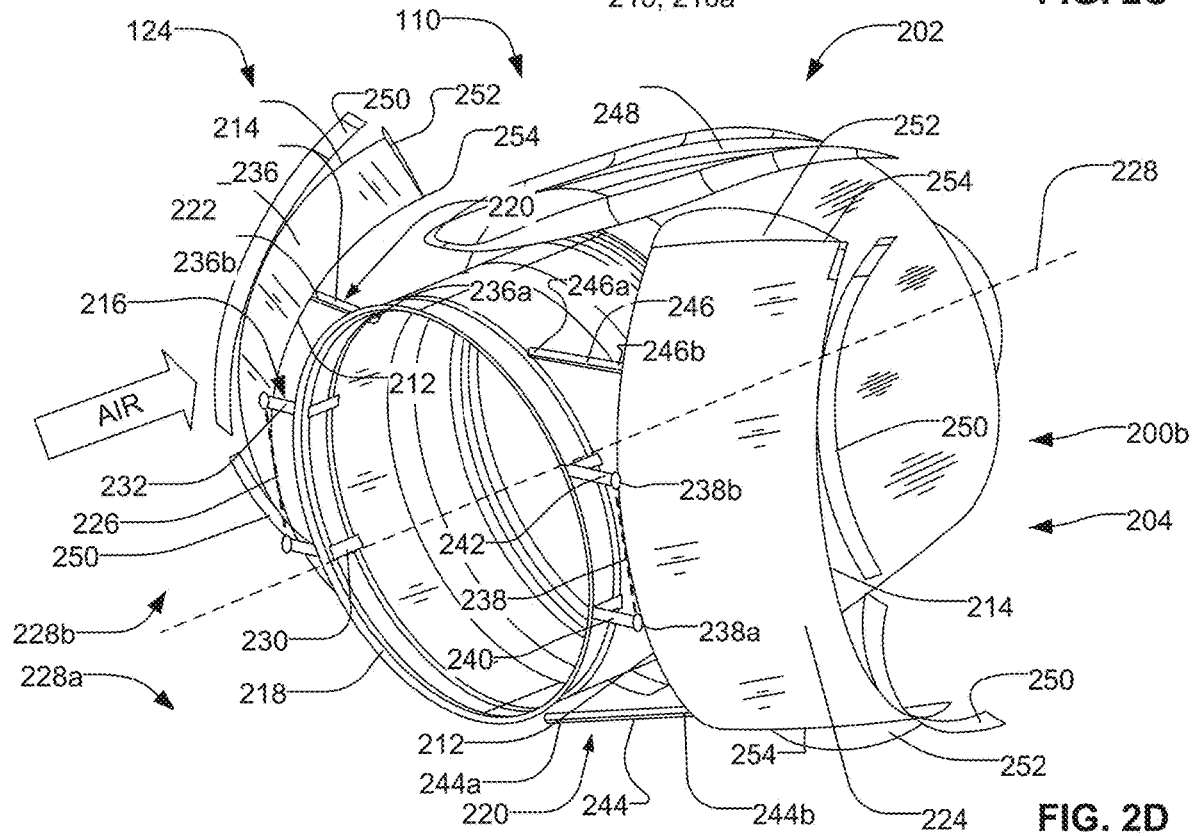
FIG. 2D is a perspective view of the example aircraft engine of FIGS. 1 and 2C shown from an outboard side of the aircraft engine.

FIGS. 2A-2D are perspective views of the aircraft engine 110 of FIG. 1. FIG. 2A depicts an inboard side 200a of the aircraft engine 110 and shows the air brake system 124 of the aircraft engine 110 in a stowed position 202. FIG. 2B shows the air brake system 124 of the aircraft engine 110 in the stowed position 202 from an outboard side 200b of the aircraft 100. FIG. 2C shows the air brake system 124 of the aircraft engine 110 in a deployed position 204 from the inboard side 200a of the aircraft 100. FIG. 2D shows the air brake system 124 of the aircraft engine 110 in the deployed position 204 from the outboard side 200b of the aircraft 100. The aircraft engine 112 of FIG. 1 is identical to the aircraft engine 110. For brevity, only the aircraft engine 110 will be discussed.

The aircraft engine 110 includes a nacelle 206 to house a core (e.g., the fan, a compressor, a turbine, a combustion chamber, etc.) of the aircraft engine 110. The nacelle 206 includes a fan cowl 208 and an engine cowl 210. The fan cowl 208 is movably coupled relative to the engine cowl 210 and/or an engine core between the stowed position 202 and the deployed position 204 to enable access to the variable pitch fan 116 (FIG. 1) during maintenance. Additionally, the fan cowl 208 moves between the stowed position 202 and the deployed position 204 during landing to provide an air brake to decelerate the aircraft 100. For example, the fan cowl 208 is an adjustable surface that provides impedance to airflow to aid in deceleration of the aircraft 100 during landing when the fan cowl is in the deployed position 204.

The fan cowl 208 has a leading edge 212 and a trailing edge 214. To move the fan cowl 208 between the stowed position 202 and the deployed position 204, a hinge assembly 216 is coupled between the leading edge 212 and a fan cage 218 of the aircraft engine 110. An actuator system 220 (FIGS. 2C and 2D) moves (e.g. rotates) the fan cowl 208 via the hinge assembly 216 between the stowed position 202 and the deployed position 204.

The fan cowl 208 of the illustrated example includes a first fan cowl 222 (e.g., a first door) and a second fan cowl 224 (e.g., a second door). The first fan cowl 222 is movably coupled to the inboard side 200a (e.g., half) of the aircraft engine 110 and the second fan cowl 224 is movably coupled to the outboard side 200b (e.g., half) of the aircraft engine 110. The first fan cowl 222 can move independently from the second fan cowl 224 between the stowed position 202 and the deployed position 204.

To pivotally couple the first fan cowl 222 to the nacelle 206 (e.g., the fan cage 218), the hinge assembly 216 includes a first hinge 216a. The first hinge 216a is positioned adjacent (e.g., closer to or at) the leading edge 212 of the first fan cowl 222 and enables rotation of the first fan cowl 222 about a first pivot axis 226. The first pivot axis 226 is non-parallel relative to a centerline 228 of the aircraft engine 110. To couple the first fan cowl 222 to the fan cage 218, the first hinge 216a includes a first bracket 230 (e.g., an L-bracket) and a second bracket 232 (e.g., an L-bracket). The first bracket 230 is located on a first side 228a of (e.g., below) the centerline 228 of the aircraft engine 110 and the second bracket 232 is located on a second side 228b of (e.g. above) the centerline 228 of the aircraft engine 110. The first hinge 216a includes a first hinge pin 226a and a second hinge pin 226b. The first hinge pin 226a pivotally couples the first fan cowl 222 to the first bracket 230 and the second hinge pin 226b pivotally couples the first fan cowl 222 to the second bracket 232.

To rotate the first fan cowl 222 about the first pivot axis 226, the actuator system 220 (FIGS. 2C and 2D) includes a first actuator 234 and a second actuator 236. The first actuator 234 and the second actuator 236 have respective first ends 234a, 236a that are supported by (e.g., fixed to) the fan cage 218. A second end 234b of the first actuator 234 is coupled to a first portion (e.g., a lower portion) of the first fan cowl 222 (e.g., on the first side 228a of the centerline 228) and a second end 236b of the second actuator 236 is coupled to a second portion (e.g., an upper portion) of the first fan cowl 222 (e.g., on the second side 228b of the centerline 228). Specifically, the second end 234b of the first actuator 234 and the second end 236b of the second actuator 236 are mounted (e.g., fixed) to the first fan cowl 222 adjacent (e.g., closer to or at) the trailing edge 214 of the first fan cowl 222. The first and second actuators 234, 236 are hydraulic actuators (e.g., hydraulic pistons). However, in some examples, the first and second actuators 234, 236 can be pneumatic actuators, electric actuators, and/or any other actuator(s) to rotate the first fan cowl 222 to the deployed position 204 and maintain the first fan cowl 222 in the deployed position 204 during a landing event.

Likewise, to pivotally couple the second fan cowl 224 to the nacelle 206 (e.g., the fan cage 218), the hinge assembly 216 includes a second hinge 216b. The second hinge 216b is positioned adjacent (e.g., closer to or at) the leading edge 212 of the second fan cowl 224 and enables rotation of the second fan cowl 224 about a second pivot axis 238. The second pivot axis 238 is non-parallel relative to the centerline 228 of the aircraft engine 110. To couple the second fan cowl 224 to the fan cage 218, the second hinge 216b includes a third bracket 240 (e.g., an L-bracket) and a fourth bracket 242 (e.g., an L-bracket). The third bracket 240 is located on the first side 228a of (e.g., below) the centerline 228 of the aircraft engine 110 and the fourth bracket 242 is located on the second side 228b of (e.g. above) the centerline 228 of the aircraft engine 110. The second hinge 216b includes a third hinge pin 238a and a fourth hinge pin 238b. The third hinge pin 238a pivotally couples the second fan cowl 224 to the third bracket 240 and the third hinge pin 238a pivotally couples the second fan cowl 224 to the fourth bracket 242. To rotate the second fan cowl 224 about the second pivot axis 238, the actuator system 220 (FIGS. 2C and 2D) includes a third actuator 244 and a fourth actuator 246. The third actuator 244 and the fourth actuator 246 have respective first ends 244a, 246a that are supported by (e.g., fixed to) the fan cage 218. A second end 244b of the third actuator 244 is coupled to a first portion (e.g., a lower portion) of the second fan cowl 224 (e.g., located on the first side 228a of the centerline 228) and a second end 246b of the fourth actuator 246 is coupled to a second portion (e.g., an upper portion) of the second fan cowl 224 (e.g., located on the second side 228b of the centerline 228). The second end 244b of the third actuator 244 and the second end 246b of the fourth actuator 246 are mounted (e.g., fixed) to the second fan cowl 224 adjacent (e.g., closer to or at) the trailing edge 214 of the second fan cowl 224. The third and fourth actuators 244, 246 are hydraulic actuators (e.g., hydraulic pistons). However, in some examples, the third and fourth actuators 244, 246 can be pneumatic actuators, electric actuators, and/or any other actuator(s) to rotate the second fan cowl 224 to the deployed position 204 and maintain the second fan cowl 224 in the deployed position 204 during a landing event.

Thus, first fan cowl 222 is symmetric or a mirror image of the second fan cowl 224 relative to the centerline 228 (e.g., or a vertical plane passing through the centerline 228). In contrast to known fan cowls, which pivot about an upper hinge located adjacent a pylon 248 of the aircraft engine 110, the trailing edges 214 of the first and second fan cowls 222 and 224 rotate in a direction away from the centerline 228 about the respective first and second pivot axes 226, 238 positioned along the leading edge 212 of the respective first and second fan cowls 222, 224. For example, in the deployed position 204, the trailing edges 214 are outboard of the leading edges 212.

To further interrupt or affect airflow to increase drag when the fan cowl 208 is in the deployed position 204, the first fan cowl 222 and the second fan cowl 224 of the illustrated example includes kicker plates 250 and chines 252. The kicker plates 250 are located adjacent the trailing edge 214 of the respective first and second fan cowls 222, 224. The chines 252 are located at respective lateral edges 254 of the first fan cowl 222 and the second fan cowl 224 between the respective leading and the trailing edges 212, 214. The kicker plates 250 are movably (e.g., pivotally) coupled to respective first and second fan cowls 222, 224 and the chines 252 are fixed to the first and second fan cowls 222, 224.

Referring to FIG. 2A, the fan cowl 208 (e.g., the first and second fan cowls 222, 224) provides an aerodynamic surface when the fan cowl 208 is in the stowed position 202 (e.g., when the first and second fan cowls 222, 224 are in the stowed position 202). In the stowed position 202, the fan cowl 208 and the engine cowl 210 provide a continuous surface 256 of the nacelle 206 such that an outer surface 258 of the fan cowl 208 is substantially flush relative to an outer surface 260 of the engine cowl 210. Further, an outer surface 262 of the kicker plates 250 are flush relative to the outer surface 260 of the fan cowl 208 and the engine cowl 210. Thus, the fan cowl 208, the kicker plates 250 and the engine cowl 210 provide a uniform or substantially smooth (e.g., aerodynamic) surface of the nacelle 206.

Referring to FIG. 2B, in the deployed position 204, the first and second fan cowls 222, 224 rotate outwardly relative to the aircraft engine 110 into an airflow stream to increase drag and provide an air brake to reduce a speed of the aircraft 100 during at least a portion of a landing event. Specifically, the trailing edges 214 of the first and second fan cowls 222, 224 move (e.g., rotate) in a direction away from the fan cage 218 and toward the leading edge 212 (e.g., a fore end of the aircraft 100). For example, the first and second fan cowls 222, 224 are substantially perpendicular to an airflow stream when the first and second fan cowls 222, 224 are in the deployed position 204. In other words, the trailing edges 214 of the first and second fan cowls 222, 224 rotate relative to the respective leading edges 212 via the hinge assembly 216 and the actuator system 220. The first and second fan cowls 222, 224 increase drag when the first and second fan cowls 222, 224 are in the deployed position 204 compared to when the first and second fan cowls 222, 224 are in the stowed position 202.

Figure 3A:
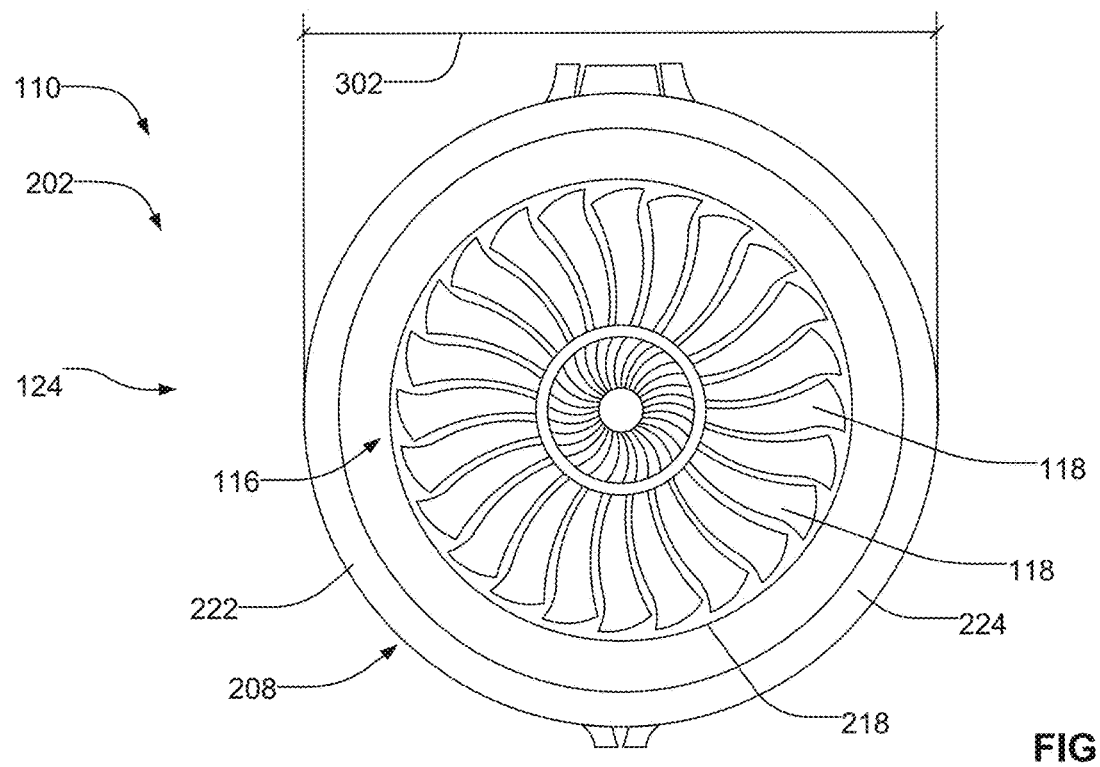
FIG. 3A is front view of the example aircraft engine of FIGS. 1, 2A and 2B.
Figure 3B:
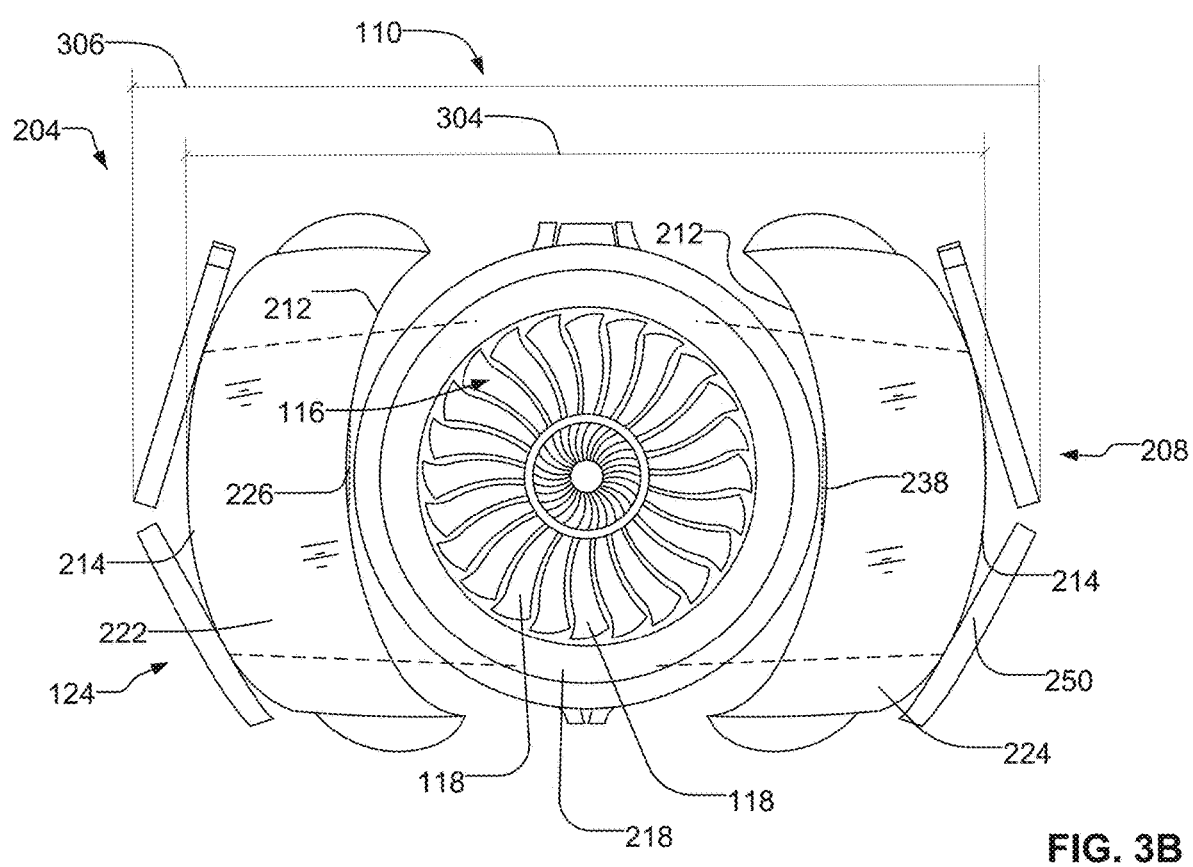
FIG. 3B is front view of the example aircraft engine of FIGS. 1, 2C and 2D.

FIGS. 3A and 3B are front views of the aircraft engine 110 of FIGS. 1 and 2A-2D. FIG. 3A is a front view of the aircraft engine 110 of FIGS. 2A and 2B showing the air brake system 124 in the stowed position 202. FIG. 3B is a front view of the aircraft engine 110 of FIGS. 2C and 2D showing the air brake system 124 in the deployed position 204. In operation, a pitch of the fan blades 118 of the variable pitch fan 116 is adjusted (e.g., varied) to provide reverse thrust to slow down the aircraft 100 during landing. The air brake system 124 (e.g., the fan cowl 208) is deployed to increase drag and further reduce the speed of the aircraft 100 during landing. The wheel brakes 122 (FIG. 1) are also activated to stop the aircraft 100. After the aircraft 100 has stopped and/or a speed of the aircraft 100 is reduced below a predetermined speed threshold (e.g., a predetermined speed), the fan cowl 208 is moved to the stowed position 202. In some instances, upon landing, both the fan blades 118 and the air brake system 124 can be used to supplement the wheel brakes 122. In some instances, the fan cowl 208 is deployed during landing only if additional braking force is needed. In some examples, the variable pitch fan 116 provides a majority of reverse thrust required to stop or decelerate the aircraft 100, whereas the air brake system 124 supplements the variable pitch fan 116. In some examples, the air brake system 124 can be used in combination with the wheel brakes 122 and/or the parachute system 126. In some examples, the air brake system 124 provides approximately between 75% and 85% (e.g., 80%) of a braking force and the wheel brakes 122 provide approximately between 15% and 25% (e.g., 20%) of a braking force to stop an aircraft (e.g., the aircraft 100) during a landing event.

In the deployed position 204 shown in FIG. 3B, the trailing edge 214 of the first fan cowl 222 pivots about the first pivot axis 226 and the trailing edge 214 of the second fan cowl 224 pivots about the second pivot axis 238. Specifically, the trailing edges 214 of the first and second fan cowls 222, 224 extend away from the fan cage 218. The trailing edges 214 of the respective first and second fan cowls 222, 224 are positioned at a distance farther from the fan cage 218 when the fan cowl 208 is in the deployed position 204 than when the fan cowl is in the stowed position 202. Additionally, in the deployed position 204, the trailing edges 214 of the first and second fan cowls 222, 224 are positioned farther from the fan cage 218 than the leading edges 212 of the first and second fan cowls 222, 224. For example, the fan cowl 208 has a first dimension 302 (e.g., a first width) when the fan cowl 208 is in the stowed position 202 and a second dimension 304 (e.g., a second width) when the fan cowl 208 is in the deployed position 204, the second dimension 304 is greater than the first dimension 302. The kicker plates 250 provide a third dimension 306 (e.g., a third width) of the fan cowl 208 that is greater than the second dimension 304. The first dimension 302, the second dimension 304 and the third dimension 306 are perpendicular (e.g., horizontal) relative to the centerline 228 (FIGS. 2A-2D) of the aircraft engine 110 in the orientation of FIGS. 3A and 3B.

The brake system controller 130 (FIG. 1) operates the fan cowl 208 during landing. In some instances, the brake system controller 130 causes the first fan cowl 222 to move to the deployed position 204 simultaneously with the second fan cowl 224. Such simultaneous deployment is advantageous when crosswind conditions do not affect landing of the aircraft 100. In some such examples, to reduce (e.g., minimize or eliminate) the effects of crosswind on the aircraft 100, the brake system controller 130 deploys the first fan cowl 222 prior to deploying the second fan cowl 224. In this manner, crosswind effects can be reduced. For example, during crosswind conditions, deploying the second fan cowl 224 prior to, or simultaneously with, the first fan cowl 222 can alter an orientation of the aircraft 100 relative to a runway. Deploying the first fan cowl 222 (e.g., an inboard fan cowl) prior to the second fan cowl 224 (e.g., an outboard fan cowl) reduces a torque that can otherwise be imparted to the aircraft 100 by the crosswind. Regardless of a fan cowl deployment sequence (i.e., simultaneously or inboard prior to outboard), the aircraft engine 112 mirrors the deployment pattern of the aircraft engine 110. In other words, a deployment pattern of the first and second fan cowls 222, 224 of the aircraft engine 110 is symmetrical to a deployment sequence of the first and second fan cowls of the aircraft engine 112.

Figure 4A:
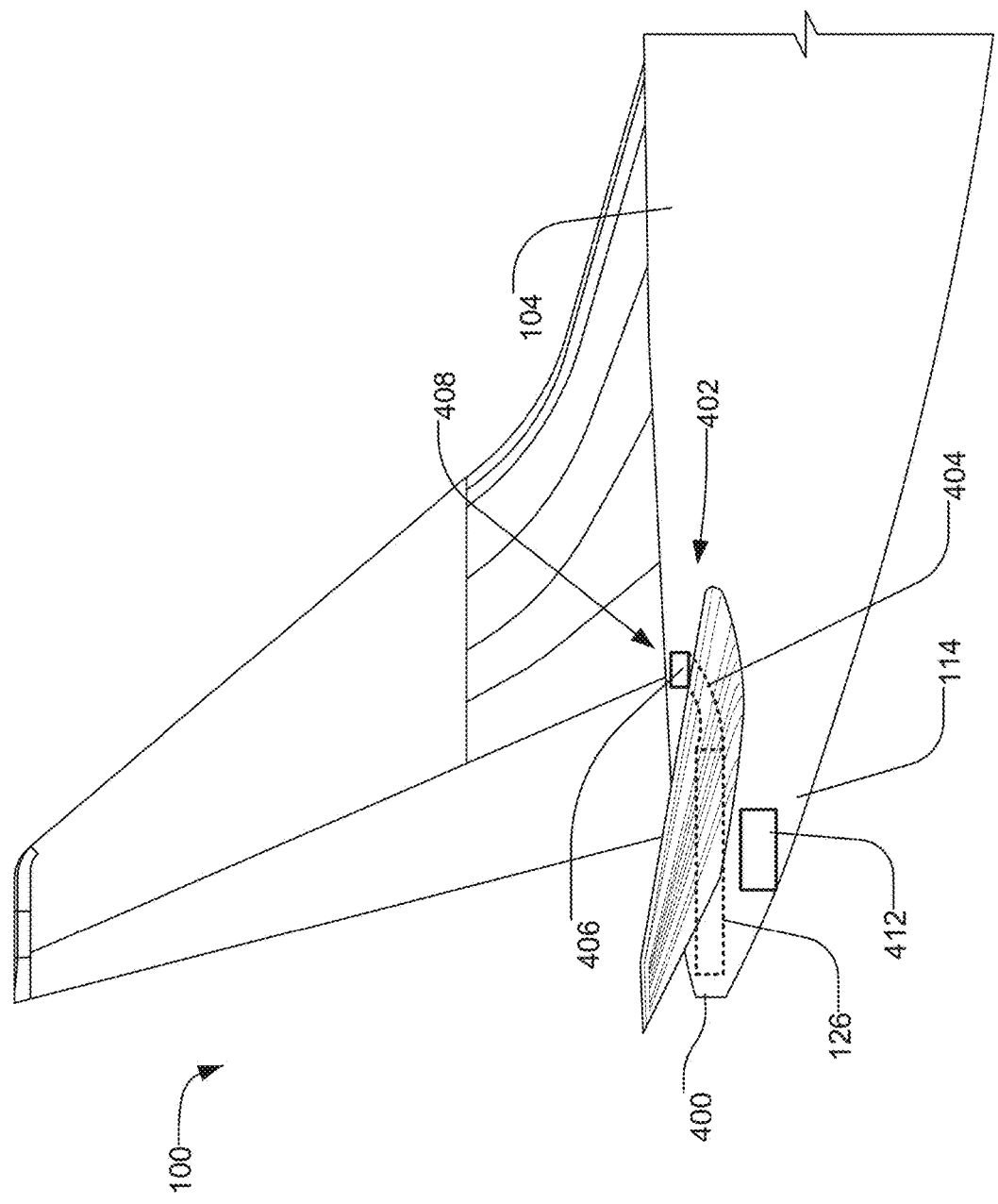
FIG. 4A is a side, partial view of the example aircraft of FIG. 1.
Figure 4B:
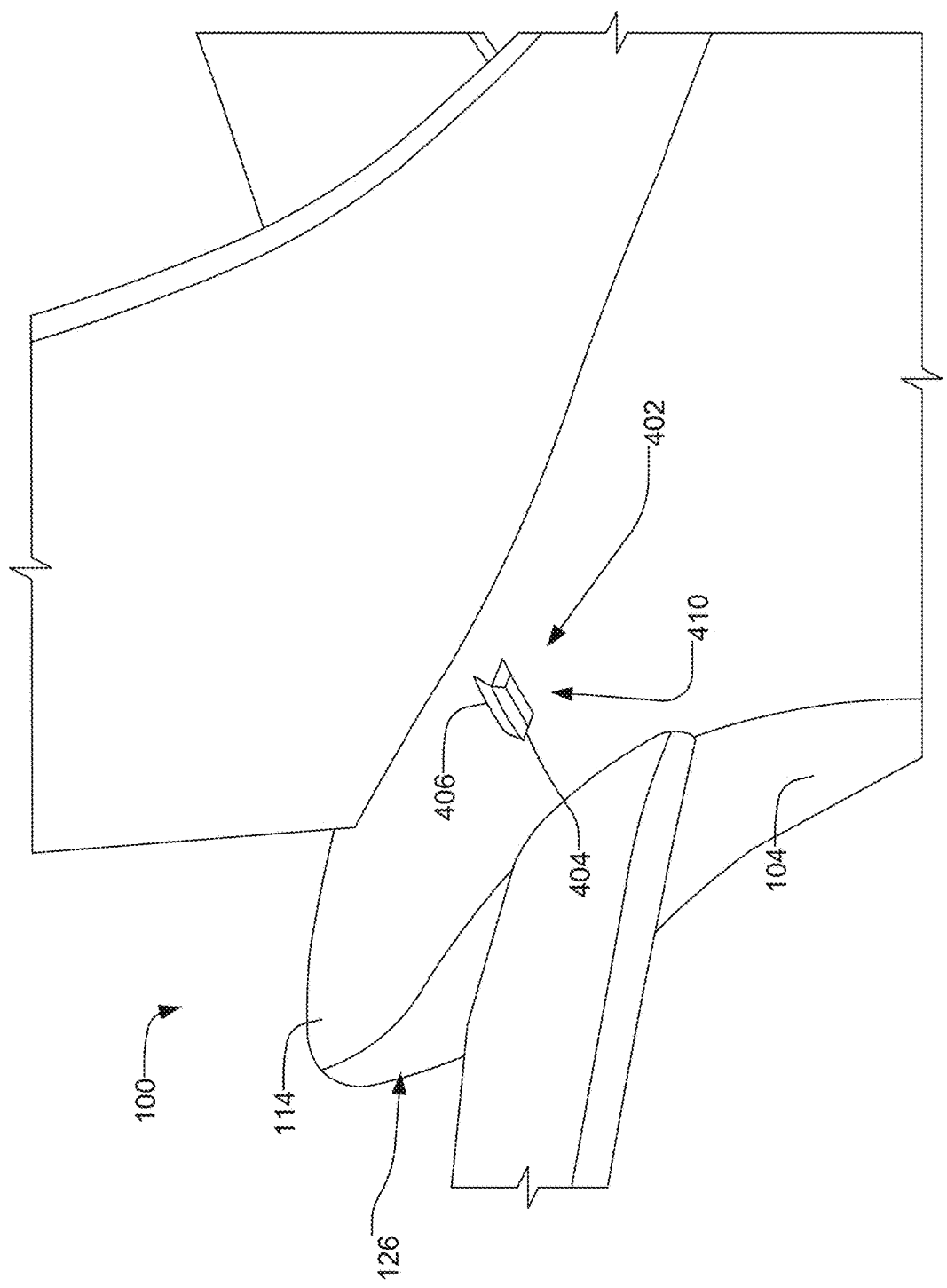
FIG. 4B is a perspective, partial view of the example aircraft of FIG. 4A.

FIG. 4A is a partial, side view of the empennage of the aircraft 100 of FIG. 1. FIG. 4B is a partial, perspective view of the empennage 114 of the aircraft 100 of FIG. 1. The parachute system 126 of the illustrated example is located or positioned in (e.g., supported by) the empennage 114 of the aircraft 100. The parachute system 126 of the illustrated example deploys from an opening 400 (e.g., a vent) defined in the empennage 114. To activate the parachute system 126, the parachute system 126 includes an air injection system 402. The air injection system 402 of the illustrated example includes a passageway 404 (e.g., a pipe) and a door 406. The passageway 404 can be provided via a duct, a hose, a channel, and/or any other passageway. The door 406 (e.g., a valve) is formed on the fuselage 104 and moves between a closed position 408 to prevent airflow to the passageway 404 and an open position 410 to allow airflow through the passageway 404. The parachute system 126 can be positioned adjacent an auxiliary power unit (APU) 412 in the empennage 114 of the aircraft 100. In some examples, the parachute system 126 can include a dedicated storage area spaced from or isolated from the APU 412.

Figure 5A:
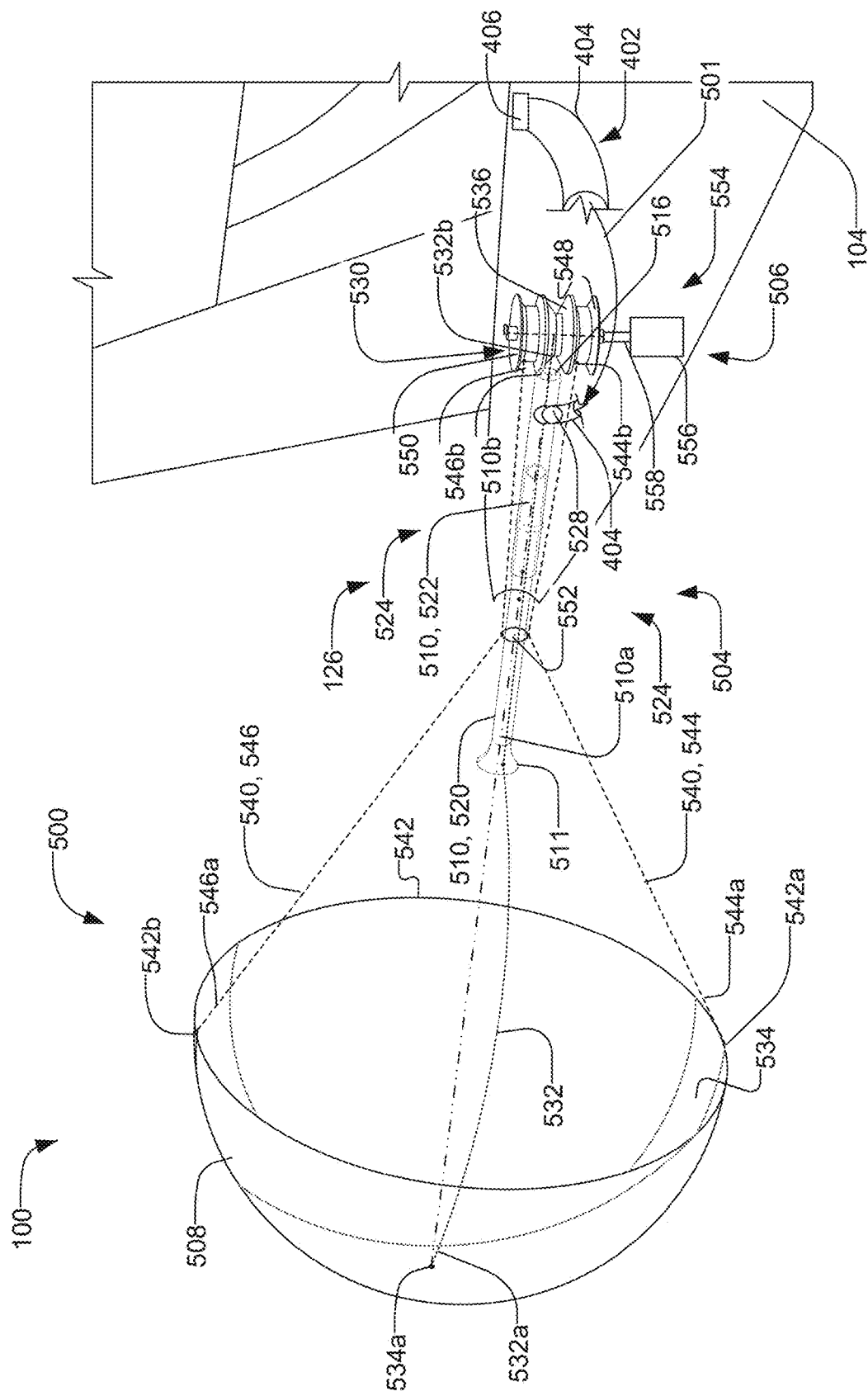
FIG. 5A is perspective, partial view of the example aircraft of FIGS. 1, 4A and 4B showing an example parachute system in an example deployed position.

FIGS. 5A and 5B are partial, perspective cut-away views of the parachute system 126 of FIG. 4. FIG. 5A illustrates the parachute system 126 in a deployed position 500. FIG. 5B illustrates the parachute system 126 in a stowed position 502. To move the parachute system 126 between the deployed position 500 and the stowed position 502, the parachute system 126 includes a parachute launching system 504 and a parachute retrieval system 506. The parachute launching system 504 includes the air injection system 402 and a launch tube 510. Specifically, the parachute launching system 504 is configured to deploy a parachute 508 from a folded or packed condition (e.g., the stowed position 502 FIG. 5B) positioned within the launch tube 510 to an unfolded condition (e.g., the deployed position 500 of FIG. 5A) in an airstream of the aircraft 100 during landing.

To receive the parachute 508 when the parachute 508 is in the folded condition, the launch tube 510 includes a passageway or opening 516 between a first end 510a of the launch tube 510 and a second end 510b of the launch tube 510. In the folded position (e.g., the stowed position 502), at least a portion of the parachute 508 is positioned inside the opening 516 of the launch tube 510. The launch tube 510 of the illustrated example includes a first tube 520 (e.g., an inner tube) and a second tube 522 (e.g., an outer tube). The first tube 520 of the illustrated example is (e.g., freely) slidable relative to the second tube 522 between an extended position 524 (FIG. 5A) and a retracted position 526 (FIG. 5B). The second tube 522 of the illustrated example is fixed to (e.g., a frame of) the empennage 114 or the fuselage 104. The launch tube 510 includes a flared end 511 adjacent the first end 510a to facilitate retrieval and/or deployment of the parachute 508.

The first tube 520 has an outer diameter that is less than an inner diameter of the second tube 522. Specifically, the first tube 520 moves (e.g., slides) from the retracted position 526 to the extended position 524 based on atmospheric air 501 provided to the launch tube 510 by the air injection system 402. Specifically, the passageway 404 of the air injection system 402 is fluidically coupled to the opening 516 the launch tube 510 to direct airflow from the atmosphere to the opening 516 of the launch tube 510. In particular, the passageway 404 of the illustrated example is fluidically coupled to the second tube 522 via a coupling 528. For example, the coupling 528 is a T-shaped coupling when coupled or formed with the second tube 522. In some examples, the passageway 404 can be directly coupled to the second end 510b of the launch tube 510 and the atmospheric air 501 can be provided through the opening 516 at the second end 510b of the launch tube 510. The atmospheric air 501 causes the first tube 520 to slide from the retracted position 526 to the extended position 524 and causes the parachute 508 to unfold from the stowed position 502 in the first tube 520 to the deployed position 500.

To retrieve the parachute after the parachute 508 is unfolded from the launch tube 510, the parachute system 126 of the illustrated example includes the parachute retrieval system 506. The parachute retrieval system 506 includes a reel 530 configured to pull the parachute 508 from the deployed position 500 to the stowed position 502 through the opening 516 of the launch tube 510. To pull the parachute 508 from the deployed position 500 to the stowed position 502 via the reel 530, the parachute retrieval system 506 includes a first cable 532. The first cable 532 has a first end 532*a* coupled to an inner surface 534 (e.g., an apex or center 534*a*) of the parachute 508 and a second end 532*b* opposite the first end 532*a* coupled to a first drum 536 of the reel 530. The first cable 532 passes through the opening 516 of the launch tube 510. The first cable 532 is attached to the center 534*a* of the parachute 508 to control a deployment and/or stow sequence and/or deployment and/or stow speed of the parachute system 126. For example, the first cable 532 is attached to the center 534*a* of the parachute 508 to control an unfolding pattern of the parachute 508 during a deployment operation and a folding pattern of the parachute 508 during a stowing operation.

Additionally, to maintain a shape of the parachute 508 when the parachute 508 is in the deployed position 500, the parachute retrieval system 506 of the illustrated example includes a plurality of cables 540 coupled to a peripheral edge 542 of the parachute 508. For example, the parachute retrieval system 506 includes a second cable 544 and a third cable 546. The second cable 544 has a first end 544*a* coupled to a first portion 542*a* of the peripheral edge 542 of the parachute 508 and a second end 544*b* coupled to a second drum 548 of the reel 530. Likewise, the third cable 546 has a first end 546*a* coupled to a second portion 542*b* of the peripheral edge 542 of the parachute 508 and a second end 546*b* coupled to a third drum 550 of the reel 530. Each of the second and third cables 544, 546 is positioned outside of the launch tube 510. In other words, the second and third cables 544, 546 do not pass inside the opening 516 (e.g., passageway) through an entire length of the launch tube 510 (i.e., in contrast to the first cable 532). To guide or space the second and third cables 544, 546, the parachute system includes a guide 552 (e.g., a spacer ring). The guide 552 is supported by the launch tube 510. For example, the guide 552 is coupled (e.g., fixed or attached) to the first tube 520. The guide 552 slidably receives the second and third cables 544, 546 and does not interfere with a parachute deployment operation and/or a parachute retrieval operation. The guide 552 also maintains a travel path of the second and third cables 544, 546 and/or prevents the second cable 544 from intertwining with the third cable 546 during a parachute deployment operation and/or a parachute retrieval operation. Although only the second and third cables 544, 546 are shown, in some examples, the parachute system 126 can include more than the second and third cables 544, 546 coupled to different locations of the peripheral edge 542 of the parachute 508 and the guide 552.

To retrieve the parachute 508 from the deployed position 500, the parachute retrieval system 506 of the illustrated example includes a reel drive 554 to operate the reel 530. The reel drive 554 of the illustrated example includes a motor 556 (e.g., an electric motor) and a transmission 558 (e.g., a gear train). The reel drive 554 of the illustrated example rotates the reel 530 in a first rotational direction (e.g., a clockwise direction in the orientation of FIGS. 5A and 5B) to wind the first, second and third cables 532, 544, 546 about the respective drums 536, 548, 550 to fold the parachute 508 to stowed position 502. As the reel drive 554 rotates the reel 530 to wind the first, second, and third cables 532, 544, 546 about the respective drums 536, 548, 550, engagement between the parachute 508 and the first tube 520 causes the first tube 520 to move the retracted position 526. In the retracted position 526, the first tube 520 causes the parachute 508 to fold (e.g., furl) in the opening 516 of the launch tube 510 as the reel drive 554 continues to rotate the reel 530 to cause the first, second, and third cables 532, 544, 546 to wind about the respective drums 536, 548, 550. The parachute retrieval system 506 can include one or more sensors (e.g., an optical sensor, a rotary sensor, an encoder, an optical rotary sensor, etc.) to determine when the parachute 508 is in the stowed position 502 and stop operation of the motor 556. The parachute retrieval system 506 retrieves the deployed parachute 508 and furls the parachute 508 in the stowed position 502 for subsequent use. In the stowed position 502, at least a portion (e.g., the second ends 544*b*, 546*b*) of the second and third cables 544, 546 can be positioned in the opening 516 of the launch tube 510 via the first end 510*a* of the opening 516 when the parachute 508 is in the stowed position 502 (FIG. 5B).

Additionally, as noted above, the first cable 532 controls the stowing sequence of the parachute 508. In other words, the first cable 532 being connected to the center 534*a* of the inner surface 534 enables a furling pattern when stowing the parachute 508 in the launch tube 510. When furling the parachute to the stowed position, the first cable 532 causes the center 534*a* of the parachute 508 to enter the launch tube 510 prior to the peripheral edge 542 of the parachute 508. In other words, the parachute 508 inverts or is turned inside out during the stowing operation. Such configuration provides for automatic stowage of the parachute 508 within the launch tube 510 which enables subsequent use of the parachute 508 (e.g., without requiring a maintenance personnel to manually pack or furl the parachute 508 into the launch tube 510). In particular, the systems describe herein provide for a parachute 508 that can be automatically re-packed within the launch tube 510 without the need for maintenance personnel to manually re-pack the parachute 508.

Additionally, the reel (e.g., the first, second and third drums 536, 548, 550) rotates freely to unfurl the parachute 508 during a deployment operation. For example, the transmission 558 can include a clutch to allow the reel 530 to rotate freely when the first, second and third cables unwind from the respective first, second and third drums 536, 548, 550. To deploy the parachute 508, the reel 530 rotates in a second rotational direction (e.g., a counterclockwise direction in the orientation of FIG. 5B).

Figure 6:
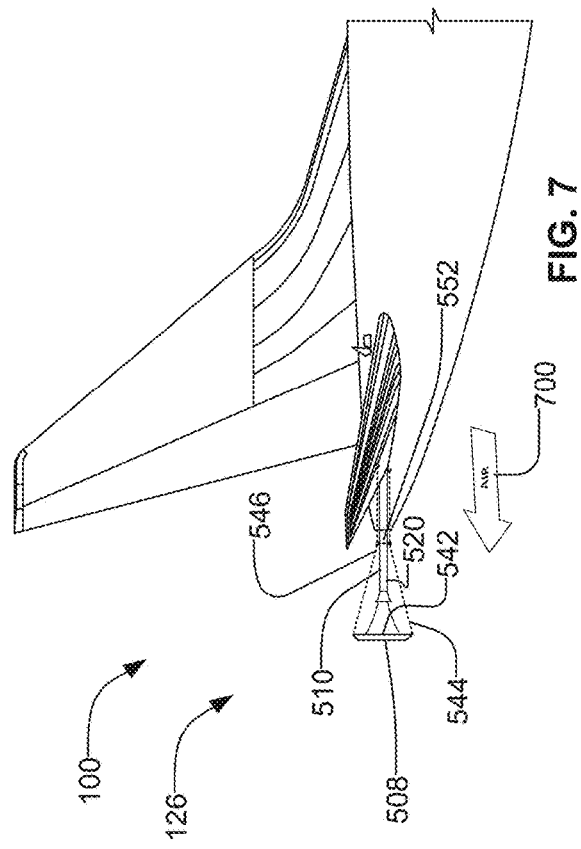
FIGS. 6-9 are side, partial views of the example aircraft of FIGS. 1, 4A, 4B, 5A and 5B illustrating an example deployment sequence of the example parachute system disclosed herein.

FIGS. 6-9 illustrate a deployment sequence operation of the parachute launching system 504 of FIGS. 1, 5A and 5B. Referring to FIG. 6, in operation, the brake system controller 130 (FIG. 1) activates the parachute launching system 504 to deploy the parachute 508. To deploy the parachute 508, the door 406 of the air injection system 402 moves to the open position 410 to allow atmospheric air in the launch tube 510. The atmospheric air causes the first tube 520 to slide relative to the second tube 522 from the retracted position 526 to the extended position 524. Additionally, the reel drive 554 allows the reel 530 to rotate freely to enable the first, second and third cables 532, 544, 546 to unwind from the respective first, second and third drums 536, 548, 550. In some examples, a clutch is activated to enable the reel 530 to rotate freely. In some examples, the reel drive 554 is configured to allow the reel 530 to rotate freely in a first rotational direction only to enable deployment of the parachute 508.

Figure 7:
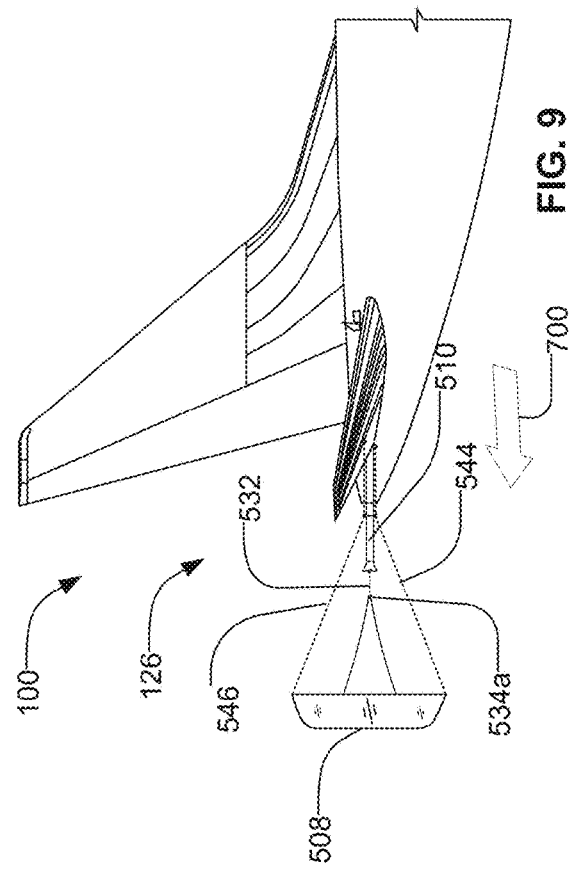

Referring to FIG. 7, as the atmospheric air continues to enter into the launch tube 510, the atmospheric air causes the parachute 508 to exit the first tube 520. Specifically, because the parachute 508 is turned inside-out when stored in the first tube 520, the peripheral edge 542 of the parachute 508 exits first from first tube 520. The second and third cables 544, 546 cause the peripheral edge 542 to turn (e.g., curl) to unfurl the parachute 508 outside-side in. As the parachute 508 starts to take form, airflow 700 from an airstream facilitates removal of the parachute 508 from the launch tube 510. The guide 552 prevents the second and third cables 544, 546 from becoming entangled during deployment of the parachute 508.

Figure 8:
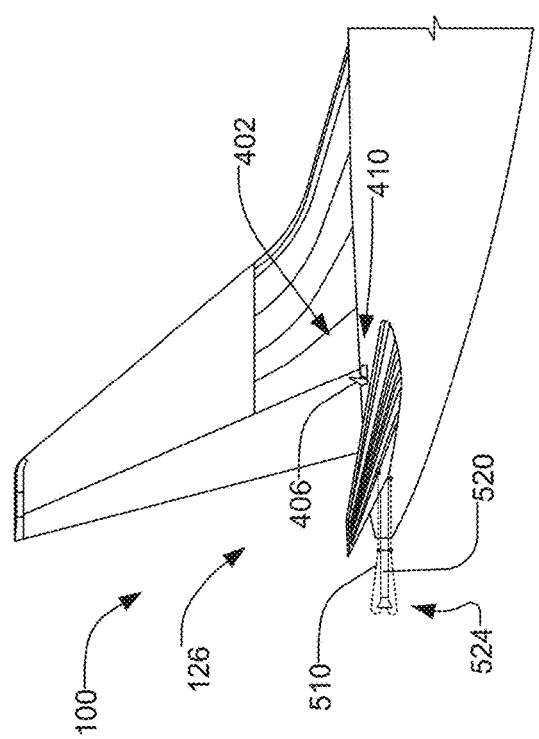
Figure 9:
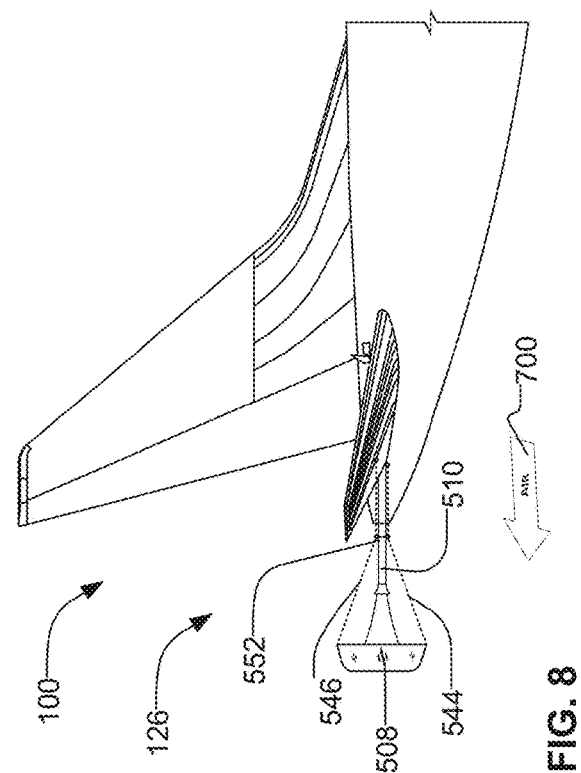

Referring to FIG. 8, the second and third cables 544, 546 guide the deployment and/or formation of the parachute 508 as the parachute 508 unfurls from the stowed position 502 to the deployed position 500. Referring to FIG. 9, the center 534a is the last portion of the parachute 508 to exit the launch tube 510.

Figure 10:
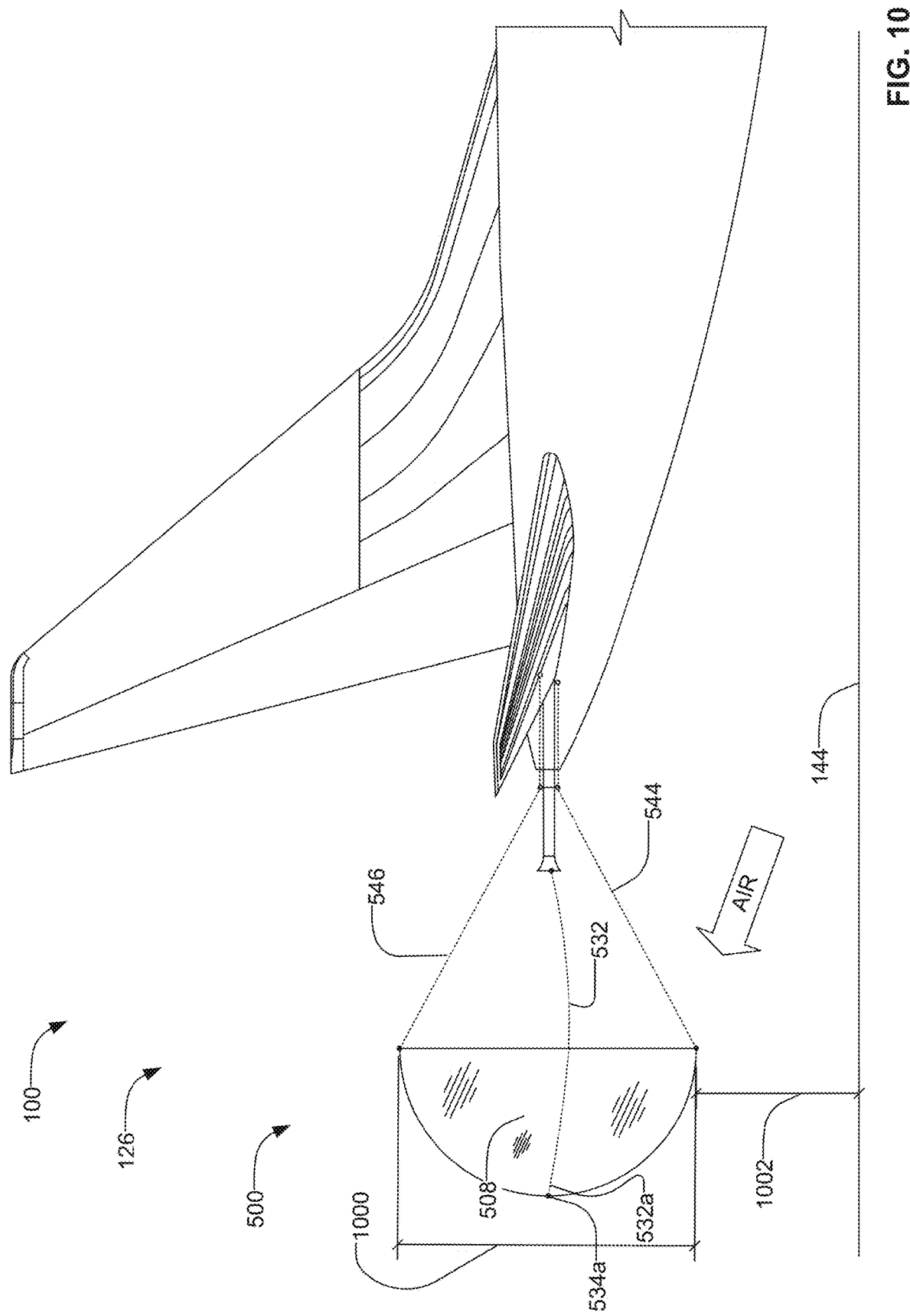
FIG. 10 is a side, partial view of the example aircraft of FIGS. 1, 4A, 4B, 5A and 5B illustrating the example parachute system in the example deployed position.

FIG. 10 illustrates the parachute 508 in the deployed position 500. In the deployed position 500, the parachute 508 has a dimension 1000 (e.g., a diameter) of approximately between 15 feet and 25 feet (e.g., 20 feet). Additionally, the parachute 508 is a distance 1002 between approximately between 2 feet and 15 feet above the ground or runway 144 (e.g., approximately 5 feet).

FIGS. 11-14 illustrate a sequence for moving the parachute 508 from the deployed position 500 of FIG. 10 to the stowed position 502 of FIG. 5B. To stow the parachute 508, the brake system controller 130 (FIG. 1) causes the door 406 of the air injection system 402 to move to the closed position 408. Additionally, the brake system controller 130 activates the parachute retrieval system 506. For example, the brake system controller 130 activates the motor 556 to cause the reel 530 to rotate in a wind direction. The transmission 558 of the reel drive 554 is engaged to enable the motor 556 to rotate the reel 530 (e.g., in a wind direction). In some examples, a clutch of the transmission 558 is activated to operatively couple the reel 530 and the transmission 558 to prevent the reel 530 from rotating freely when the motor 556 activates to cause the first, second and third cables 532, 544, 546 to wind about the respective first, second and third drums 536, 548, 550.

Figure 11:
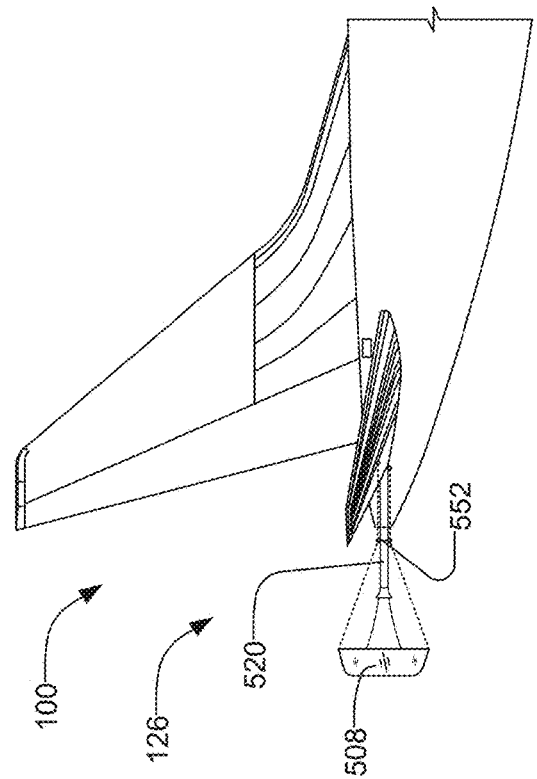
FIGS. 11-14 are side, partial views of the example aircraft of FIGS. 1, 4A, 4B, 5A and 5B illustrating an example retrieval sequence of the example parachute system disclosed herein.

Referring to FIG. 11, the first cable 532 is positioned through the opening 516 of the launch tube 510 to cause the center 534a of the parachute 508 to enter the launch tube 510 prior to the peripheral edge 542 entering the launch tube 510. In other words, the center 534a is inverted in the stowed position 502 relative to the deployed position 500. To enable the center 534a to enter prior to the peripheral edge 542, the reel drive 554 rotates the first drum 532 to wind the first cable 532. In some examples, the reel drive 554 operates the first drum 532 to rotate at a rate (e.g., rpm) greater than a rate of the second and third drums 548, 550. In some examples, the first, second and third drums 536, 548, 550 rotate at the same rate.

Figure 12:
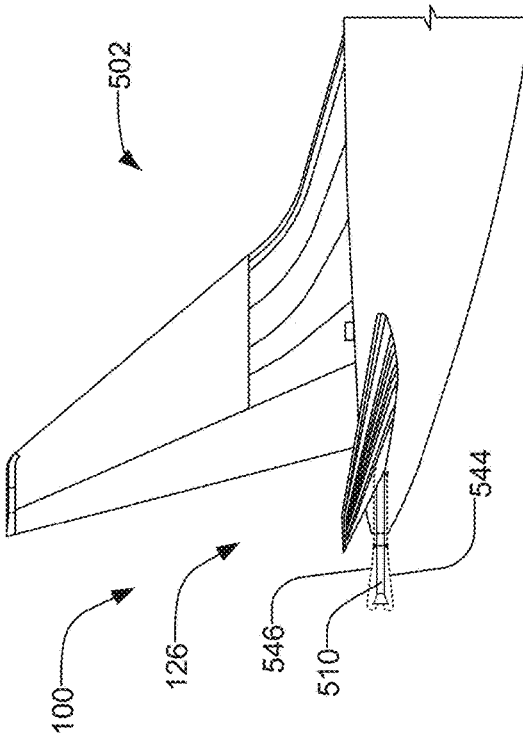

Referring to FIG. 12, after center 534a enters the first tube 520, the reel drive 554 continues to rotate the reel 530. As the first, second and third cables 532, 544, 546 wind about the respective first, second and third drums 536, 548, 550, the parachute 508 is drawn into the first tube 520. The guide 552 continues to guide the second and third cables 544, 546 to prevent the second and third cables 544, 546 from intertwining as the parachute 508 is packed to the stowed position 502.

Figure 13:
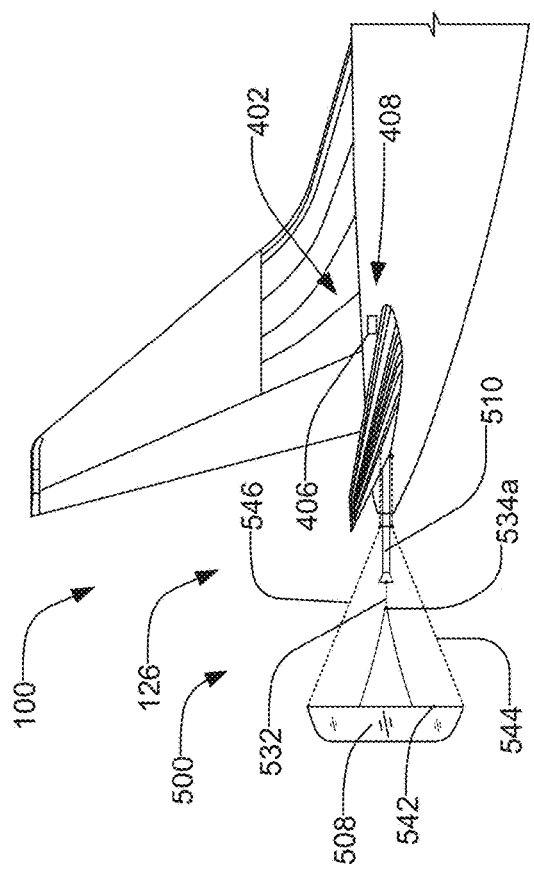

Referring to FIG. 13, the peripheral edge 542 of the parachute 508 is the last portion of the parachute 508 to enter the launch tube 510. The first, second and third cables 532, 544, 546 enable the stowing pattern.

Figure 14:
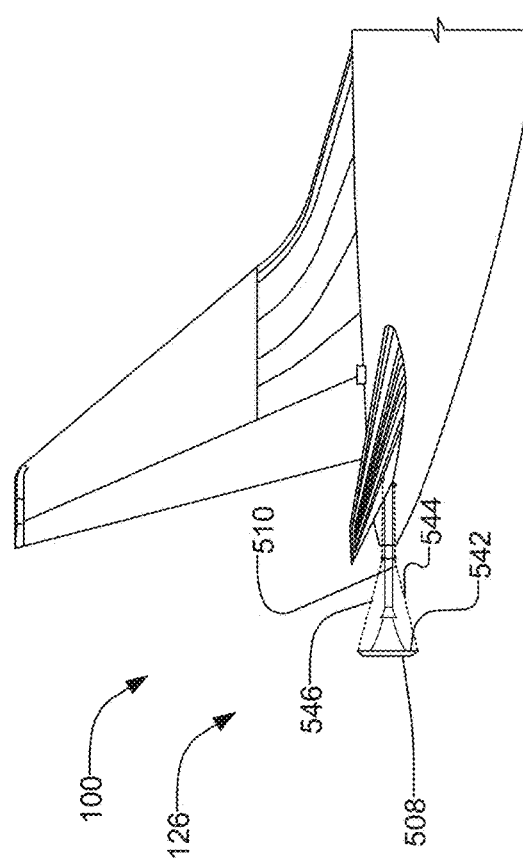

Referring to FIG. 14, the reel drive 554 continues to rotate the reel 530 to cause the first tube 520 to slide relative to the second tube 522 to the retracted position 524. The brake system controller 130 deactivates the reel drive 554 when the parachute system 126 is in the stowed position 502. The parachute 508 is ready to be deployed for subsequent use. Thus, the parachute retrieval system 506 furls the parachute 508 in the launch tube 510 for subsequent use without having to manually repack the parachute 508 in the launch tube 510.

Figure 15:
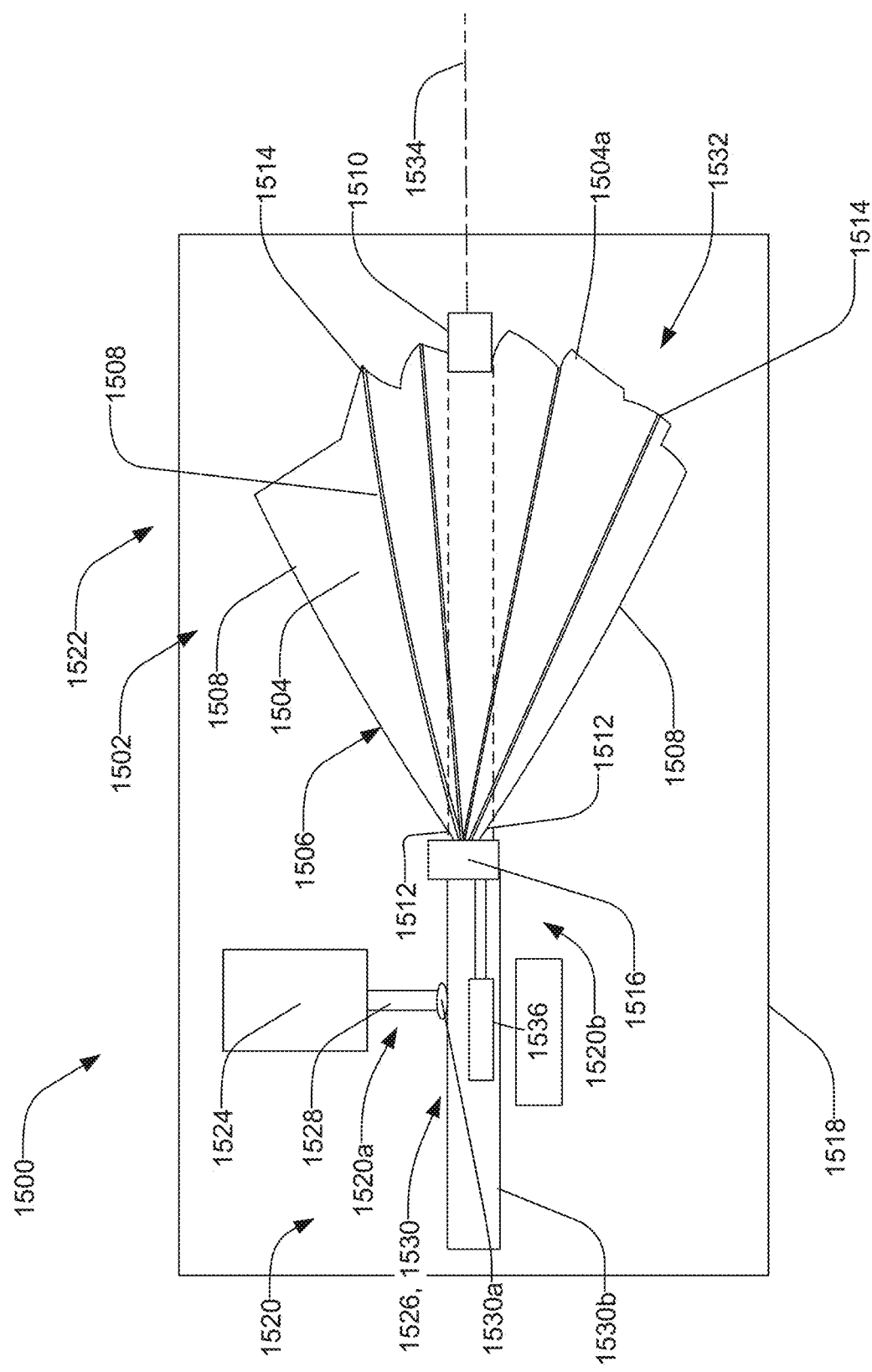
FIG. 15 illustrates another example parachute system disclosed herein that can implement the example aircraft of FIG. 1.
Figure 16:
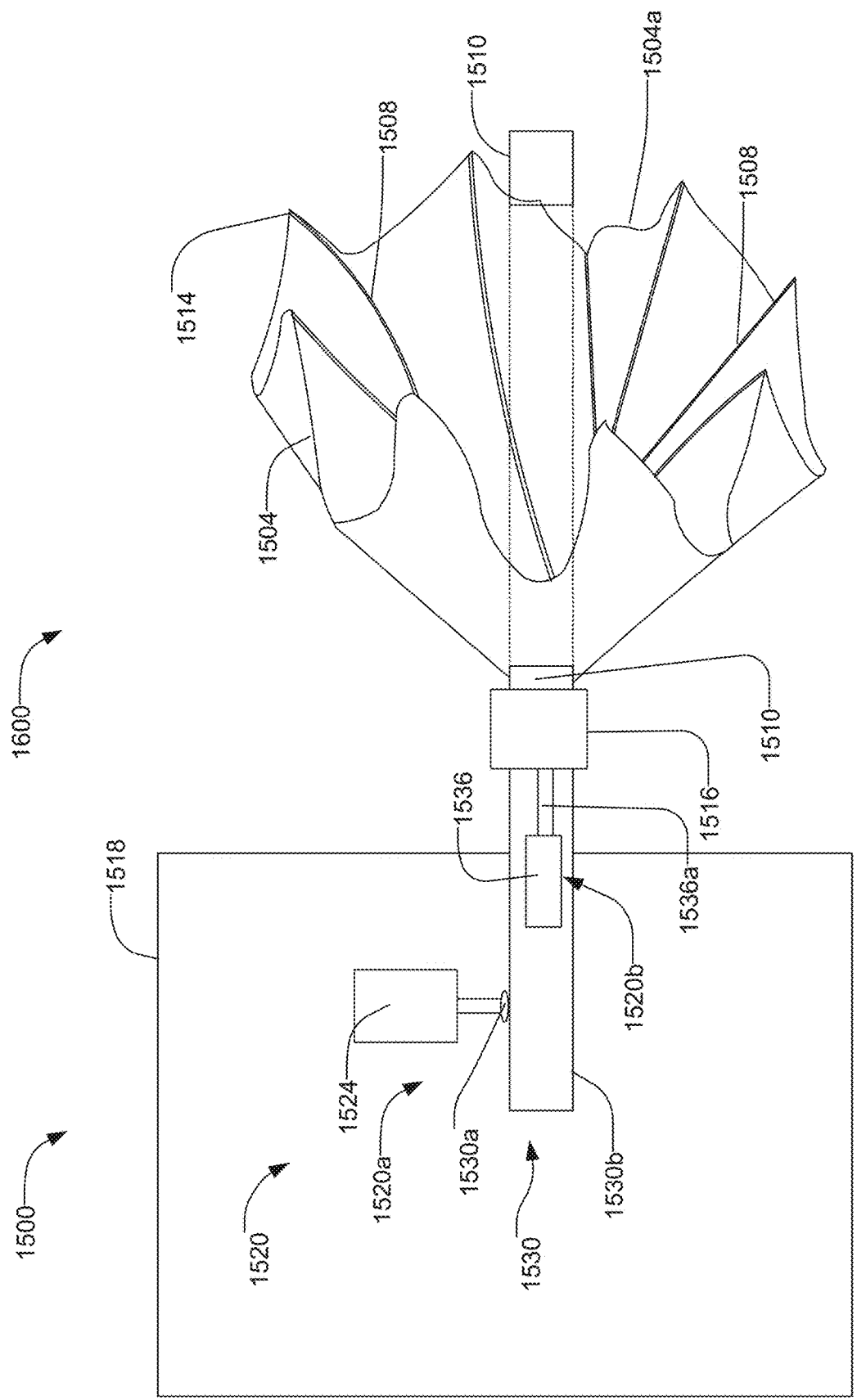
FIG. 16 illustrates the example parachute system of FIG. 15 in an example intermediate position.
Figure 17:
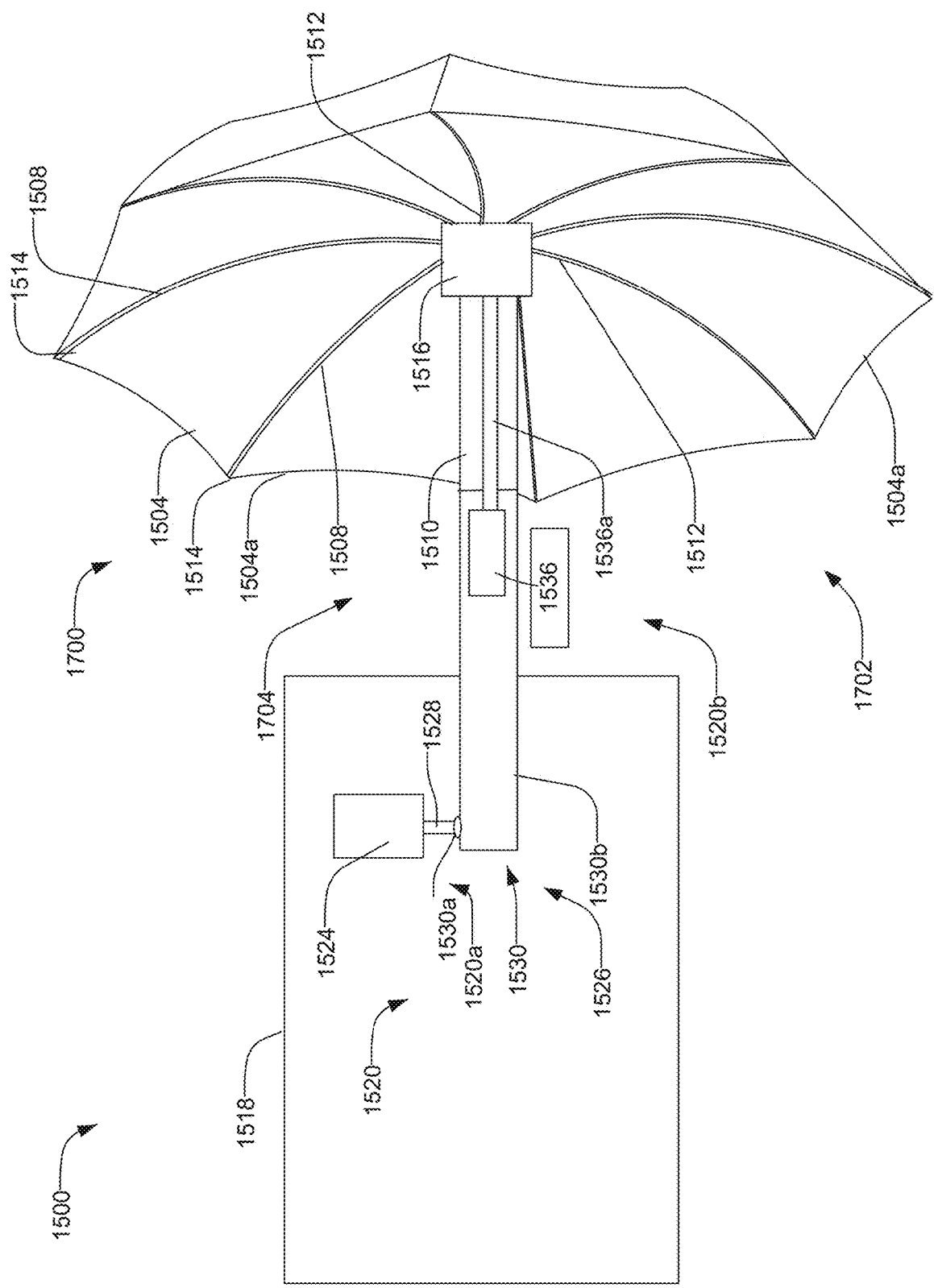
FIG. 17 illustrates the example parachute system of FIGS. 15 and 16 in an example deployed position.

FIGS. 15-17 illustrate another parachute system 1500 that can implement the parachute system 126 of FIG. 1. FIG. 15 illustrates the parachute system 1500 in a stowed position 1502. FIG. 16 illustrates the parachute system 1500 in an intermediate position 1600. FIG. 17 illustrates the parachute system 1500 in a deployed position 1700. Referring to FIG. 15, the parachute system 1500 of the illustrated example includes a parachute 1504 supported by a frame 1506 (e.g., a flexible frame). The frame 1506 provides or defines a shape of the parachute 1504 when the parachute 1504 is in the deployed position 1700 and/or the stowed position 1502.

The frame 1506 includes a plurality of arms 1508 (e.g., flexible arms, spindles, etc.) to support the parachute 1504 and a central shaft 1510 to support the plurality of arms 1508. For example, first ends 1512 of the arms 1508 are attached to the central shaft 1510 and respective second ends 1514 of the arms 1508 are attached to a peripheral edge 1504a of the parachute 1504. The first ends 1512 of the arms 1508 are coupled to the central shaft 1510 via a collar 1516. The collar 1516 of the illustrated example is slidably coupled to the central shaft 1510.

The parachute system 1500 includes a housing 1518 to house the parachute 1504. The housing 1518 is to be positioned in an empennage (e.g., the empennage 114 of FIG. 1) of an aircraft (e.g., the aircraft 100 of FIG. 1). In some examples, the housing 1518 can be aligned with the opening 400 of the empennage 114 of FIG. 4.

To move the parachute 1504 between the stowed position 1502 (e.g., as shown, for example, in FIG. 15) and the deployed position 1700 (e.g., as shown, for example, in FIG. 17), the parachute system 1500 includes a parachute launching/retrieval system 1520. The parachute launching/retrieval system 1520 includes a first drive 1520a and a second drive 1520b. However, in other examples, the parachute system 1500 can include only one drive to deploy and/or stow the parachute 1504. In other examples, the parachute system 1500 can include more than two drives to deploy and/or stow the parachute 1504.

The first drive 1520a moves the parachute 1504 in a rectilinear direction (e.g., a sideways or horizontal direction in the orientation of FIG. 15) relative to the housing 1518 (e.g., or empennage) between a retracted position 1522 (e.g., shown in FIG. 15) and an extended position 1702 (e.g., shown in FIG. 17). To move the parachute 1504 in a rectilinear direction, the first drive 1520a includes a motor 1524 and a transmission 1526. The transmission 1526 transfers rotary motion of a shaft 1528 of the motor 1524 to linear motion of the parachute 1504 relative to the housing 1518 (e.g., via a gear train). For example, the transmission 1526 includes a rack and pinion configuration 1530 to move the parachute 1504 from the retracted position 1522 to the extended position 1702. For example, a pinion gear 1530a is coupled to the shaft 1528 of the motor 1524 and a rack gear 1530b is coupled to the central shaft 1510. In some examples, the transmission 1526 includes one or more gears (spur gears, bevel gears, etc.), chains, sprockets, pulleys belts and/or any other gear train system(s) for moving the parachute between the retracted position 1522 and the extended position 1702.

The second drive 1520b moves the parachute 1504 between a collapsed position 1532 shown in FIG. 15 and an expanded position 1704 (e.g., an unfolded or open position) shown in FIG. 17 via the collar 1516. Specifically, the second drive 1520b moves the collar 1516 along the central shaft 1510 to cause the parachute 1504 to move from the collapsed position 1532 and the expanded position 1704. To extend the parachute 1504, the second drive 1520b moves the collar 1516 along the central shaft 1510 in a direction away from the housing 1518 in the orientation of FIGS. 15-17. As the collar 1516 moves along the central shaft 1510 away from the housing 1518, the peripheral edge 1504a of the parachute 1504 moves outwardly away from the central shaft 1510 to form a cup shape as shown in the expanded position 1704. To collapse the parachute 1504, the second drive 1520b moves the collar 1516 along the central shaft 1510 in a direction toward the housing 1518 in the orientation of FIGS. 15-17. As the collar 1516 moves along the central shaft 1510 in a direction toward the housing 1518, the peripheral edge 1504a moves inwardly toward the central shaft 1510 to the collapsed position 1532. In the collapsed position 1532, the parachute 1504 is in an inside-out orientation. Thus, the parachute 1504 inverts when the parachute 1504 moves from the expanded position 1704 to the collapsed position 1532.

To move the collar 1516 along the central shaft 1510, the second drive 1520b includes an actuator 1536 operatively coupled to the collar 1516. A control system (e.g., the brake system controller 130 of FIG. 1) commands the actuator 1536 to extend or retract an arm 1536a coupled to the collar 1516 to move the collar 1516 along the central shaft 1510 and, thus, move the parachute 1504 between the expanded position 1704 and the collapsed position 1532. The second drive 1520b can be carried by the central shaft 1510 and/or the first drive 1520a. For example, the second drive 1520b can be supported by the rack gear 1530b.

Referring to FIG. 16, the first drive 1520a and the second drive 1520b operate concurrently to move the parachute 1504 between the stowed position 1502 and the deployed position 1700. In other words, the first drive 1520a can operate simultaneously with the operation of the second drive member 1520b as the parachute 1504 moves between the stowed position 1502 and the deployed position 1700. In some instances, the first drive 1520a does not operate concurrently with the operation of the second drive 1520b. In some such instances, the first drive 1520a operates to move the parachute 1504 from the retracted position 1532 to the extended position 1702. Subsequently, or after the parachute 1504 is in the extended position 1702, the second drive 1520b operates to move the collar 1516 to cause the parachute 1504 to move from the collapsed position 1532 to the expanded position 1704. The operation of the first drive 1520a and the second drive 1520b are reversed to move the parachute 1504 from the deployed position 1700 to the stowed position 1502. Similar to the parachute system 126 of FIG. 1, the parachute system 1500 of FIGS. 15-17 enables automated packing of the parachute 1504 for subsequent use without requiring personnel to manually repack the parachute 1504 in the housing 1518.

Figure 18:
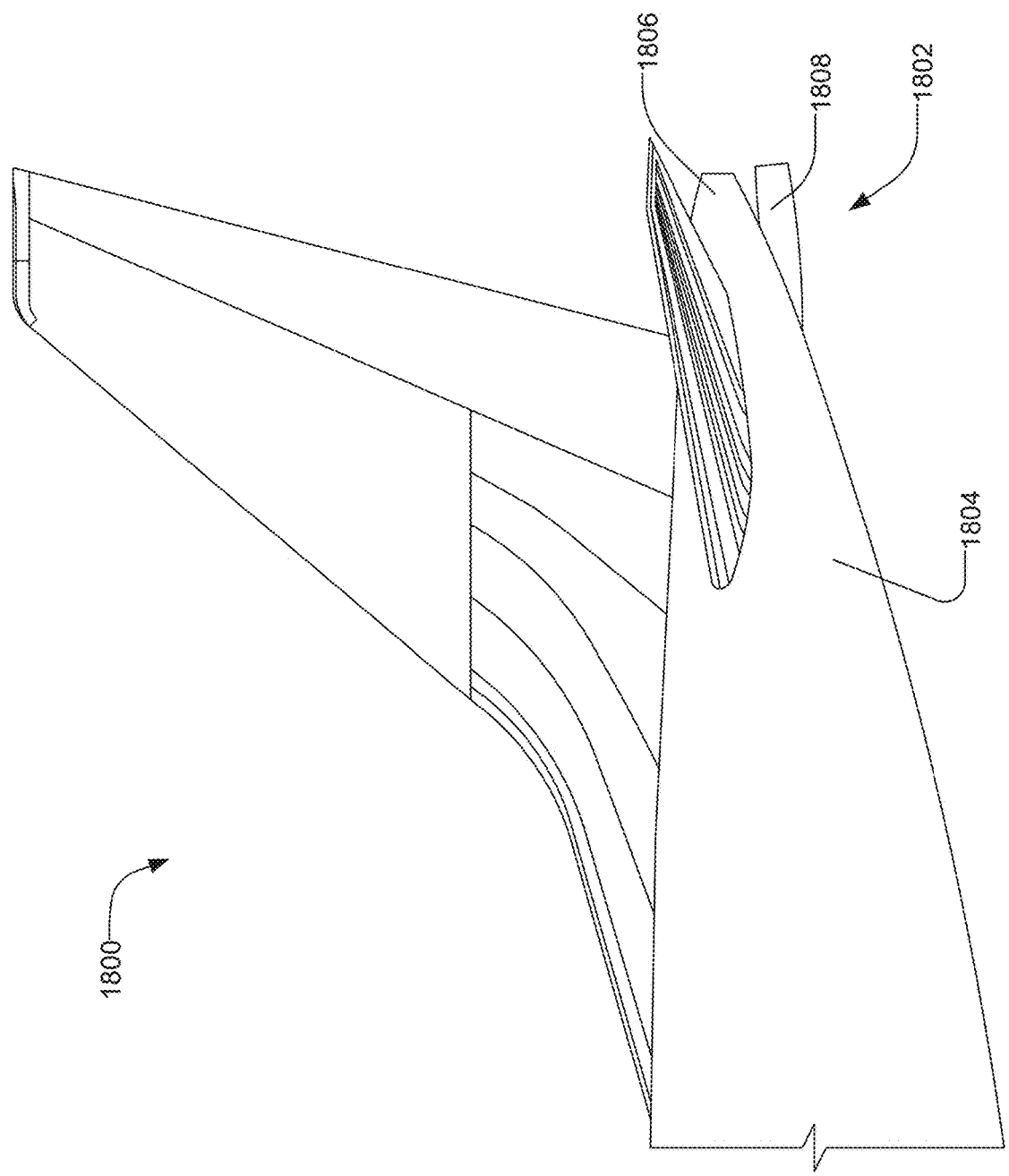
FIG. 18 is a side, partial view of another example aircraft and parachute system disclosed herein.

FIG. 18 is another aircraft 1800 having another parachute system 1802 disclosed herein. The aircraft 1800 of the illustrated example includes an empennage 1804 having a first portion 1806 to store the parachute system 1802 and a second portion 1808 to store an APU system (e.g., the APU 412 of FIG. 4). The first portion 1806 is isolated or separate from the second portion 1808. The first portion 1806 can include the parachute system 126 of FIGS. 1, 5A, 5B and 6-14 or the parachute system 1500 of FIGS. 15-17.

Figure 19:
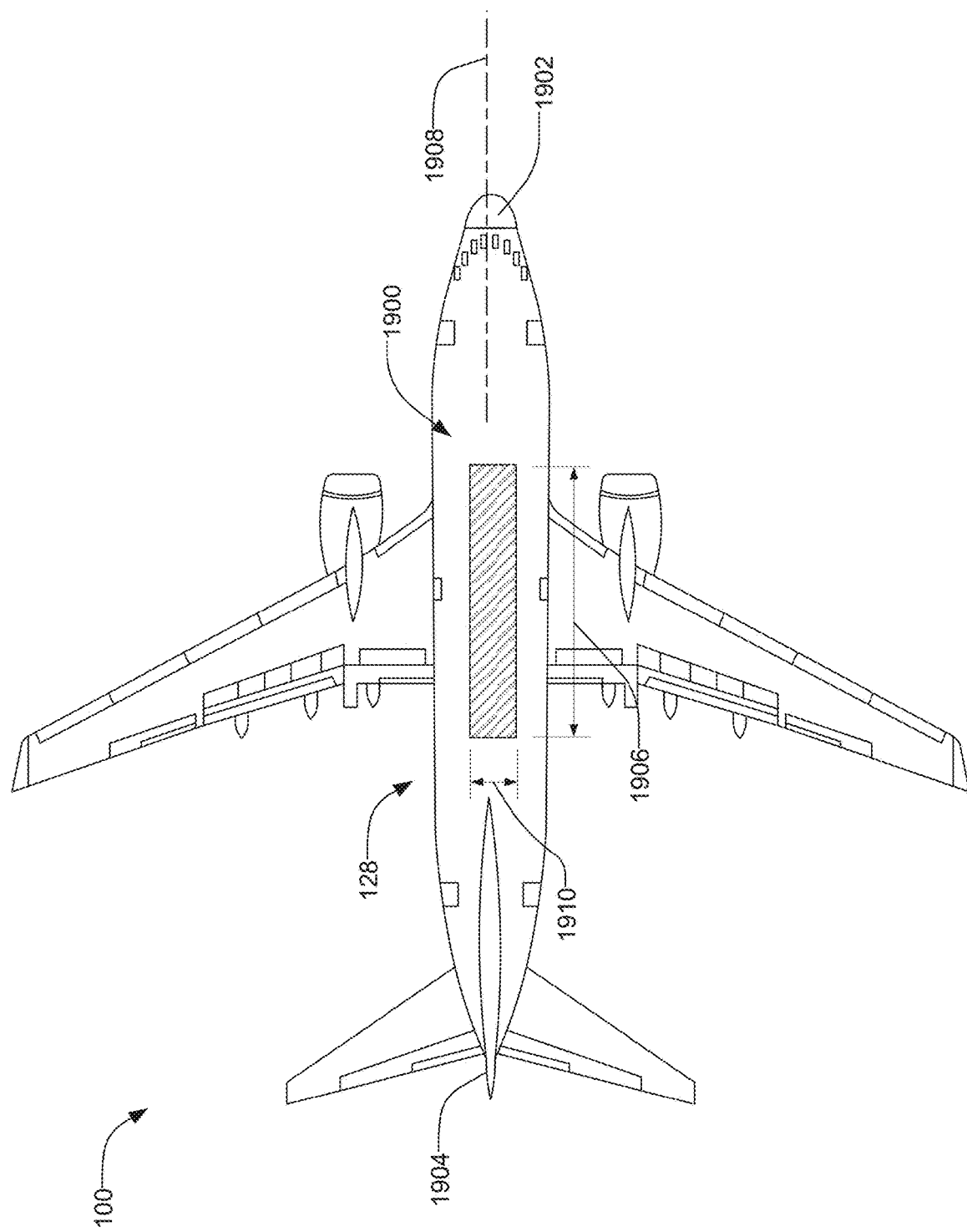
FIG. 19 is a top view of the example aircraft of FIG. 1 illustrating an emergency brake system disclosed herein.

FIG. 19 is a top view of the example aircraft 100 of FIG. 1. The aircraft 100 of the illustrated example includes the emergency brake system 128. The emergency brake system 128 includes a brake 1900 positioned between a nose 1902 and a tail 1904 of the aircraft 100. The brake 1900 has a first dimension 1906 (e.g., a length parallel to a longitudinal axis 1908 of the aircraft 100) and a second dimension 1910 (e.g., a width perpendicular to the longitudinal axis 1908 of the aircraft). In some examples, the first dimension 1906 is approximately between 5 feet and 30 feet (e.g., 10 feet) and the second dimension is approximately between 5 feet and 15 feet (e.g., 10 feet). The brake 1900 of the illustrated example has a rectangular shape. In some examples, the brake 1900 can have a square shape and/or any other shape. For example, a greater surface of area of the brake 1900 (e.g., defined by the first dimension 1906 and the second dimension 1910 the shorter a stopping distance provided by the brake 1900. For example, a brake having a surface area of 49 square feet can provide an aircraft weighing 41,000 Kg and moving at 12 knots a stopping distance of between approximately 770 meters and 775 meters and a brake having a surface area of 100 square feet can provide a stopping distance of between approximately 1540 meters and 1550 meters. In some examples, the brake 1900 can generate approximately between 4 and 5 G-force of negative thrust during deployment or operation. Additionally, the brake 1900 can be deployed to generate such negative thrust more quickly than, for example, reverse thrusters.

Figure 20A:
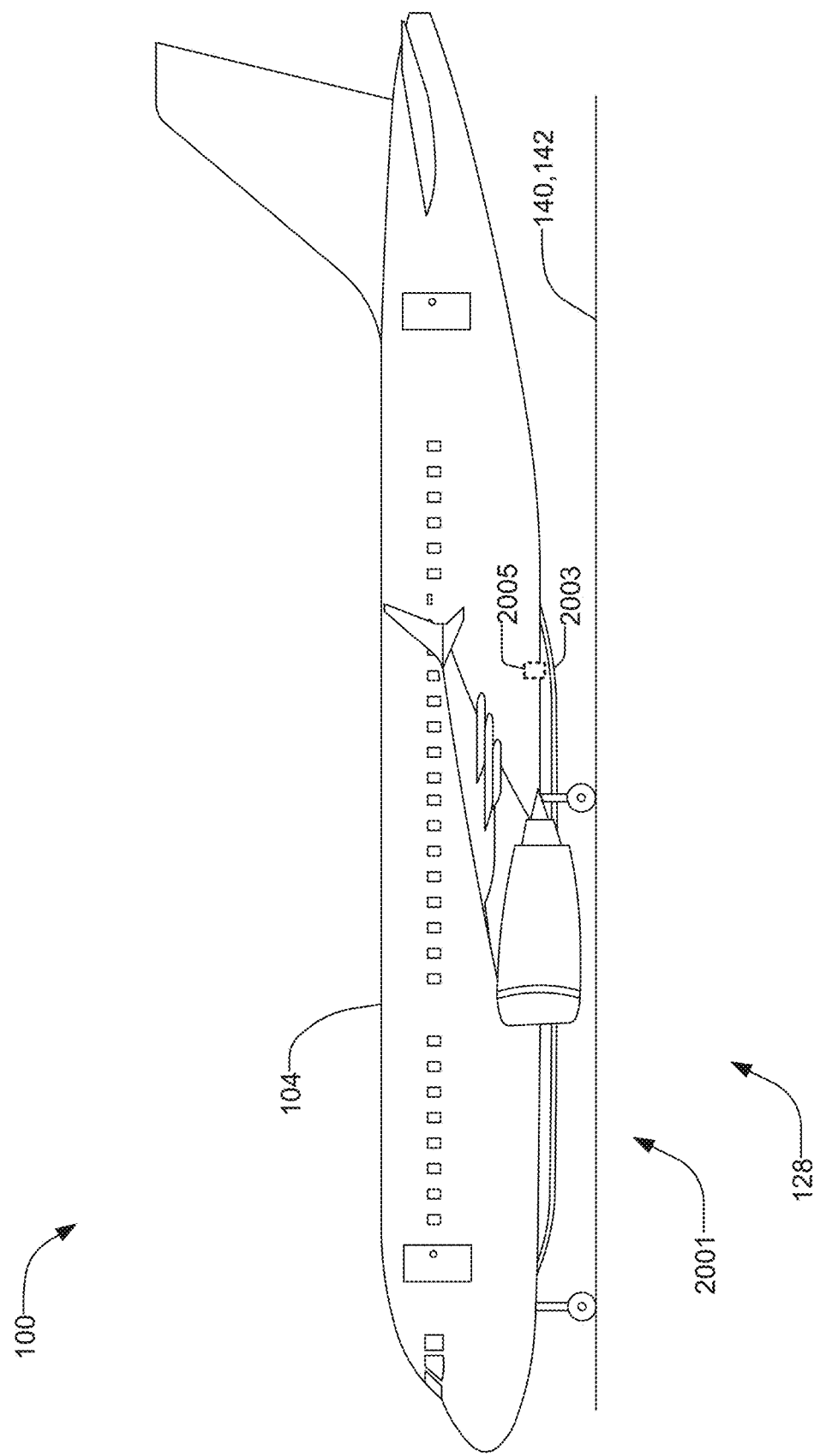
FIG. 20A is a side view of the example aircraft of FIG. 19 illustrating the emergency brake system in an example stowed position.

FIG. 20A is a side view of the example aircraft of FIG. 19 illustrating the emergency brake system in an example stowed position 2001. The brake 1900 is stored at a lower surface of the fuselage 104. In some examples, the brake 1900 is stored at a belly of the fuselage 104. The brake 1900 is covered by a cover 2003 (e.g., an aluminum skin). In some such examples, the cover 2003 is removed via a cover actuator 2005 (e.g., a drag chute, a pyrotechnic actuator, an airbag actuator, etc.). In some examples, movement of the brake 1900 to a deployed position 2000 (FIG. 2B). In some examples, the fuselage 104 includes doors that open to deploy the brake 1900.

Figure 20B:
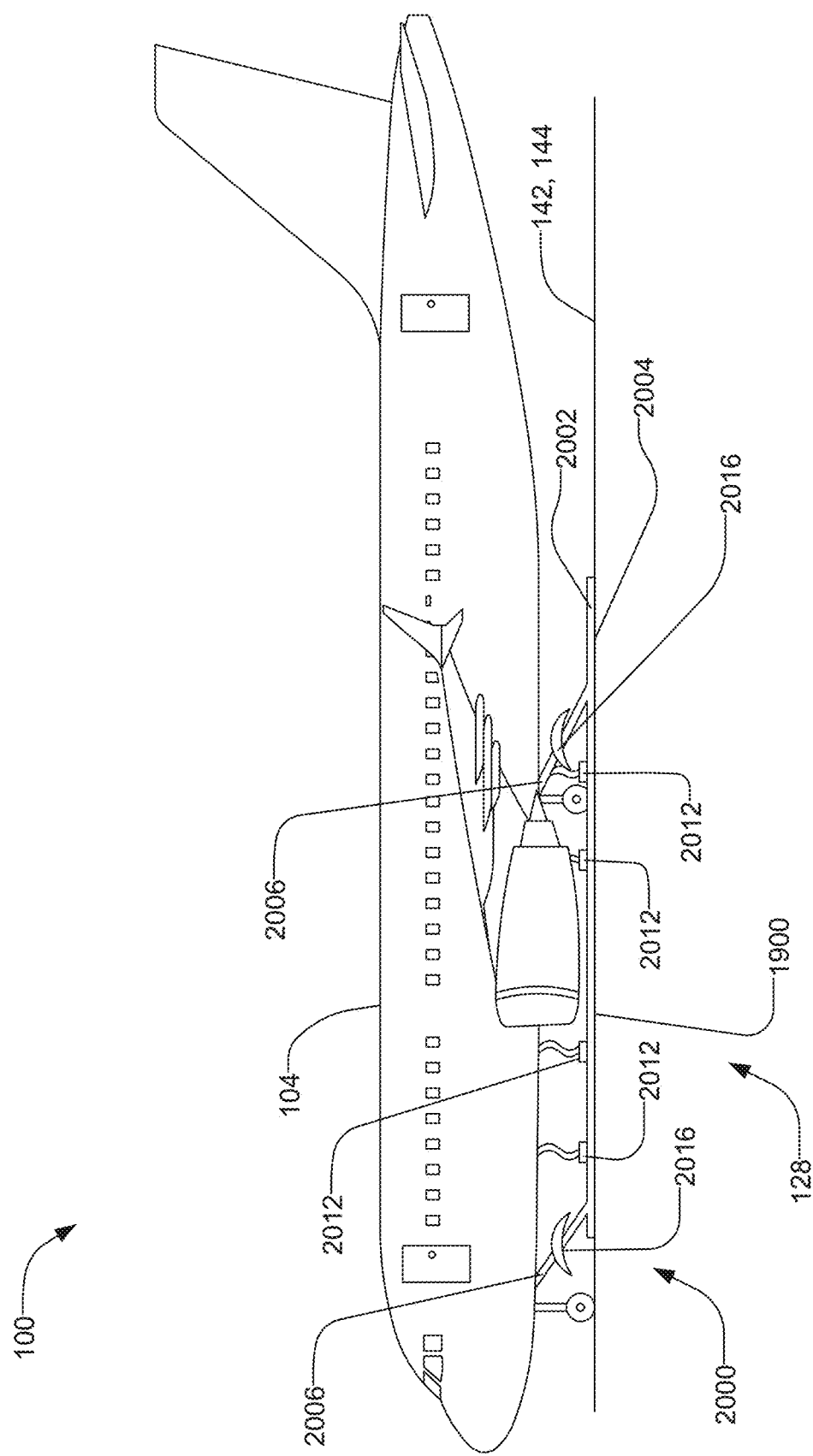
FIG. 20B is a side view of the example aircraft of FIG. 19 illustrating the emergency brake system in an example deployed position.

FIG. 20B is a side view of the aircraft 100 showing the brake 1900 in a deployed position 2000. The brake 1900 includes a frame 2002 (e.g., a sled, a housing, a hub, etc.) to support a brake pad 2004 and pivot arms 2006 (e.g., braces or links) that pivot the brake 1900 from a stowed position to the deployed position 2000. In some examples, the brake pad 2004 includes a plurality of brake pads. The pivot arms 2006 are coupled (e.g., pivotally coupled) to the fuselage 104. To form a seal between the brake pad 2004 and the surface 142 of the runway 144, the brake 1900 of the illustrated example includes a plurality of actuators 2012 (e.g., suction generators). The actuators 2012 of the illustrated example generate a vacuum between the brake pad 2004 and the surface 142 to form a seal around or within a peripheral boundary or peripheral edge 2004a (e.g., a perimeter) (FIG. 21) of the brake pad 2004 when the brake pad 2004 is in engagement with the surface 142. For example, the actuators 2012 of the illustrated example can be pyrotechnic actuators (e.g., airbag actuators), pneumatic actuators, vacuum generators, and/or any other type of actuator to provide a seal at a peripheral edge 2004a of the brake pad 2004. Additionally, to cause downward airflow and/or a force on the frame 2002 during operation, the brake 1900 includes airfoils 2016. The airfoils 2016 are formed on or supported by the pivot arms 2006. However, in other examples, the airfoils 2016 can be formed on or supported by the frame 2002 and/or another portion of the brake 1900 or the aircraft 100.

Figure 21:
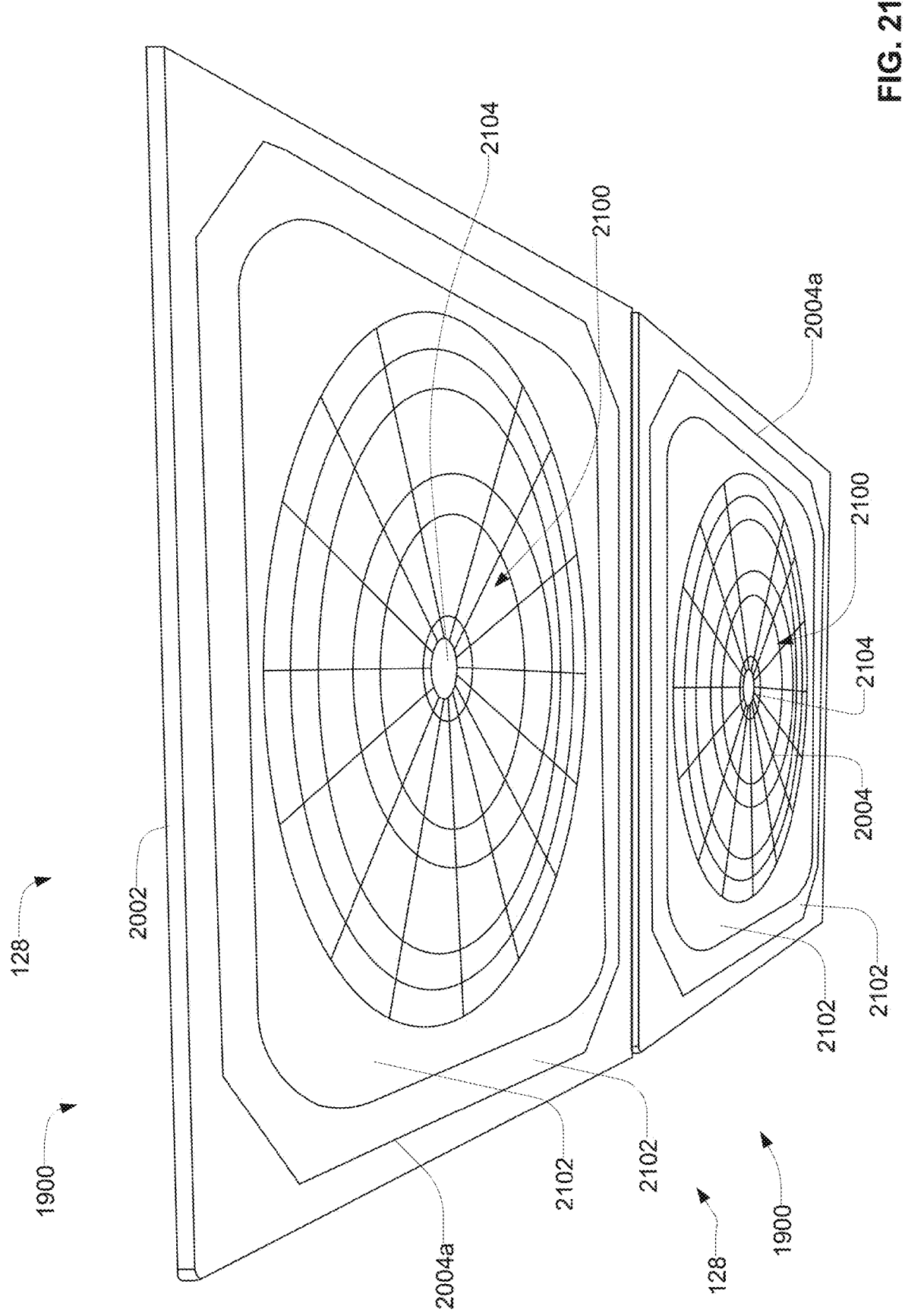
FIG. 21 is a perspective, partial view of an example brake pad of the example emergency brake system of FIG. 20B.

FIG. 21 is a partial, perspective view of the brake 1900 illustrates a pad surface 2100 of the brake pad 2004. The brake pad 2004 includes a plurality of raised surfaces or protrusions 2102 to increase friction between the brake pad 2004 and the surface 142. To fluidly couple the actuators 2012 and the pad surface 2100, the brake pad 2004 includes a plurality of openings 2104. Respective ones of the openings 2104 fluidly couple to respective ones of the actuators 2012. In this manner, the actuators 2012 apply a vacuum to generate a force to pull the brake 1900 against (e.g., to seal against) the surface 142 of the runway 144. The brake pad 2004 include a non-asbestos organic (NAO) material, glass, fiber, rubber, carbon, Kevlar and/or any other suitable material(s).

FIG. 22 is a partial, perspective view of the brake 1900 in the deployed position 2000. Each of the actuators 2012 include a hose or tube 2202 to fluidly couple a respective one of the openings 2104 (FIG. 21) to a canister 2204 of the actuator 2012. In some examples, the canister 2204 contains the pyrotechnic material(s). Also, in some examples, the canister 2204 can be located in the fuselage 104 of the aircraft. In some examples, the canister 2204 can be positioned on a surface of the fuselage 104. The tube 2202 is coupled to the frame 2002 via a connector 2206. In some examples, the connector 2206 includes or houses the pyrotechnic material to generate a vacuum at the pad surface 2100. In some such examples, the tube 2202 is removed.

The brake 1900 of the illustrated example can be deployed to prevent runway excursions. The brake system controller 130 of FIG. 1 is configured to deploy the brake 1900 automatically (e.g., without pilot or crew input) during an emergency. In some examples, the brake 1900 can be deployed manually by a pilot or crew via an actuator in the cockpit of the fuselage 104.

Figure 23A:
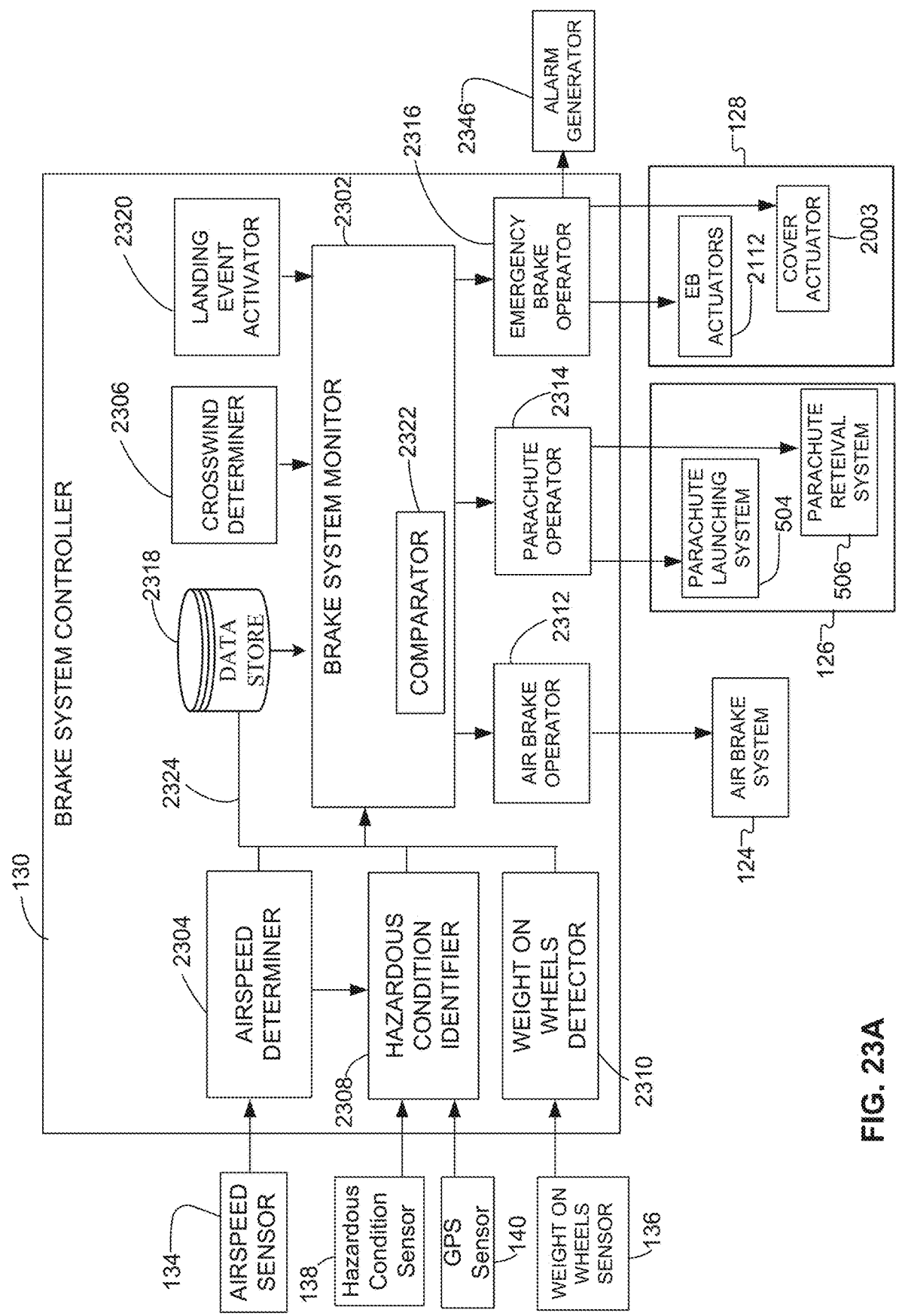
FIG. 23A is a block diagram of the example brake system controller of FIG. 1.
Figure 23B:
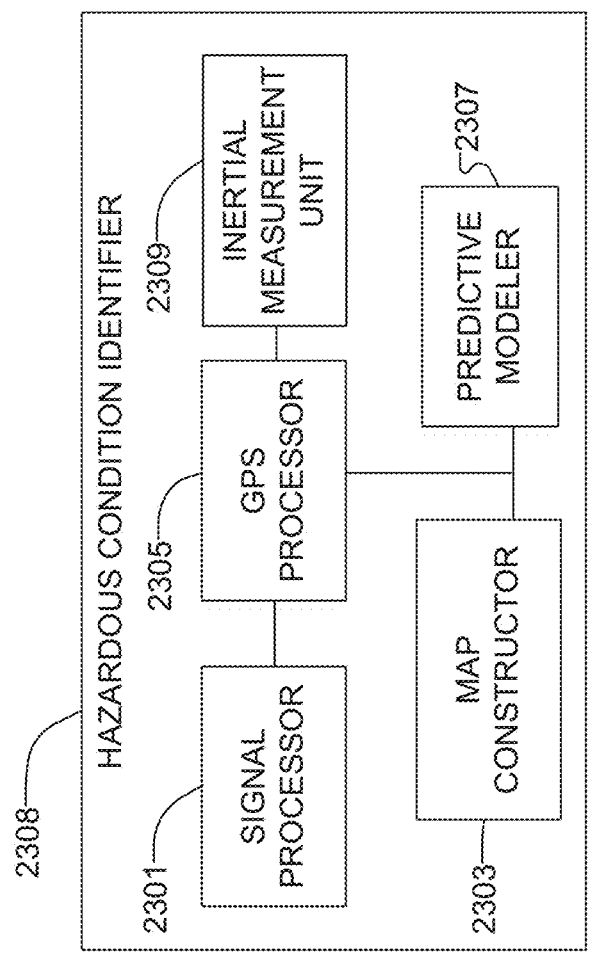
FIG. 23B is a block diagram of an example hazardous condition identifier of FIG. 23A.

FIG. 23A is a schematic illustration of the brake system controller 130 of FIG. 1. FIG. 23B is a schematic illustration of the hazardous condition identifier 2308. The example brake system controller 130 of the illustrated example includes an example brake system monitor 2302, an example airspeed determiner 2304, an example crosswind determiner 2306, and an example hazardous condition identifier 2308, an example weight on wheels determiner 2310, an example air brake operator 2312, an example parachute operator 2314, an example emergency brake operator 2316, and an example data store 2318, and a landing event activator 2320. The brake system monitor 2302 includes an example comparator 2322. The comparator 2322 can be implemented by one or more comparators. In some examples, the example brake system monitor 2302, the example airspeed determiner 2304, the example crosswind determiner 2306, the example hazardous condition identifier 2308, the example weight on wheels determiner 2310, the example air brake operator 2312, the example parachute operator 2314, the example emergency brake operator 2316, the example data store 2318, the landing event activator 2320, and the alarm generator 2346 are in communication via a communication bus 2324.

The hazardous condition identifier 2308 includes an example signal processor 2301, an example map constructor 2303, an example GPS processor 2305, an example inertial measurement unit 2309, and a predictive modeler 2307.

The example brake system monitor 2302 of the illustrated example analyzes signals from the airspeed determiner 2304, the crosswind determiner 2306, the hazardous condition identifier 2308, the weight on wheels determiner 2310, the landing event activator 2320 and/or other parameters provided from, for example, the engine control system 132 of FIG. 1, an air traffic control tower and/or any other sensor(s) sensors of the aircraft 100 of FIG. 1. For example, the signals received by the brake system monitor 2302 and/or by the airspeed determiner 2304, the crosswind determiner 2306, the hazardous condition identifier 2308, the weight on wheels determiner 2310 and the landing event activator 2320 can be binary value(s) (e.g., on/off), digital value(s) (e.g., binary bit "1" or "0"), and/or analog values. Based on the signals received, the brake system monitor 2302 determines whether to activate the air brake system 124, the parachute system 126 and/or the emergency brake system 128. For example, the brake system monitor 2302 is communicatively coupled to, and processes signals from, the airspeed determiner 2304, the crosswind determiner 2306, the hazardous condition identifier 2308, the weight on wheels determiner 2310, and/or the landing event activator 2320 to determine activation of the brake system 102.

The brake system monitor 2302 monitors for activation of the air brake system 124 and the parachute system 126 in response to receiving a communication, command or a signal from the landing event activator 2320. In some examples, the landing event activator 2320 provides a first signal to disable the brake system monitor 2302 from monitoring for a landing event or provides a second signal different than the first signal to enable the brake system monitor 2302 to monitor for a landing event. For example, during a take-off event, the landing event activator 2320 disables the brake system monitor 2302 to prevent activation of the air brake system 124 and the parachute system 126. However, during a landing event, the landing event activator 2320 enables the brake system monitor 2302 to activate or operate the air brake system 124 and the parachute system 126. The landing event activator 2320 does not disable or affect operation or activation of the emergency brake system 128 when the landing event activator disables the brake system monitor 2302 during a take-off event. Thus, during a take-off event, the brake system monitor 2302 can activate the emergency brake system 128.

To disable operation of the air brake system 124 and the parachute system 126 during a take-off event, the landing event activator 2320 receives a first input signal (e.g., a binary bit "0" value). To enable operation of the air brake system 124 and the parachute system 126 during a landing event, the landing event activator 2320 receives a second input signal (e.g. a binary bit "1" value). For example, a pilot may provide the first input signal to disable the air brake system 124 and the parachute system 126 during a take-off event via an input device (e.g., a lever, a button, a touch screen, etc.) in a cockpit of the aircraft 100.

The brake system monitor 2302 monitors for detection of the aircraft 100 in flight or on the surface 142 in response to receiving a communication, command or a signal from the weight on wheels determiner 2310. The weight on wheels determiner 2310 of the illustrated example determines whether the aircraft 100 is on the surface 142 or in flight based on signals received from the weight on wheels sensor 136. For example, the weight on wheels sensor 136 can be configured to output a first signal (e.g., an output signal of the binary bit "1") when the wheels 120 of the aircraft 100 are in contact with the surface 142 and a second signal (e.g., an output signal of the binary bit "0") when the wheels 120 of the aircraft 100 are not in contact with the surface 142. The weight on wheels determiner 2310 determines that the aircraft 100 is on the surface 142 based on the first signal received (e.g., an output signal of the binary bit "1" from the weight on wheels sensor 136) and determines that the aircraft 100 is not on the surface 142 based on a second signal received (e.g., an output signal of the binary bit "0" from the weight on wheels sensor 136). Based on the signals received, the weight on wheels determiner 2310 communicates a first signal (e.g., a binary bit "1" value) to the brake system monitor 2302 representative of the aircraft 100 being on the surface 142 or communicates a second signal (e.g., a binary bit "0" value) to the brake system monitor 2302 representative of the aircraft 100 being in flight. When the brake system monitor 2302 receives the first signal from the weight on wheels determiner 2310 indicative of the aircraft 100 being in flight, the brake system monitor 2302 ignores (e.g., does not process) and/or does not receive signals from the airspeed determiner 2304, the hazardous condition identifier 2308 and/or the crosswind determiner 2306. In some examples, when the weight on wheels determiner 2310 detects that the aircraft 100 is in flight, the brake system monitor 2302 can be in a sleep mode to prevent operation of the brake system 102 until the brake system monitor 2302 is activated by the landing event activator 2320.

The brake system monitor 2302 monitors aircraft speed in response to commands, communication or signals received from the airspeed determiner 2304. The airspeed determiner 2304 receives output signals from the airspeed sensor 134 and analyzes the signals to determine a speed (e.g., velocity) of the aircraft 100. For example, the airspeed sensor 134 can be a barometric sensor (e.g., a pitot tube and a static port) that measures a pressure differential between ram air pressure and static pressure. The airspeed determiner 2304 can convert the signals from the airspeed sensor 134 to an electrical signal (e.g., a digital signal, an analog signal, etc.) corresponding to an airspeed of the aircraft 100 based on the signals from the airspeed sensor 134. For example, the airspeed determiner 2304 can include a pneumatic to current (P/I) converter that converts a pressure reading from the airspeed sensor 134 to a corresponding airspeed value.

The crosswind determiner 2306 receives a crosswind value via parameters provided to the engine control system 132 and/or the brake system controller 130 from other sensors and/or received input(s). For example, an air traffic control center can provide crosswind information to the engine control system 132 and/or the crosswind determiner 2306. In some examples, information or data (e.g., a reference crosswind value) may be provided to the crosswind determiner 2306 and/or the engine control system 132 via an input/output interface (e.g., a display, a touch screen, a visual indicator, etc.) positioned in a cockpit of the aircraft 100. In some examples, the aircraft 100 can include sensors (e.g. LIDAR sensors) to measure air velocity and the crosswind determiner 2306 can be configured to measure a crosswind associated with an orientation of the aircraft 100 relative to the runway 144. The crosswind determiner 2306 communicates a crosswind value to the brake system monitor 2302.

The brake system monitor 2302 monitors for hazardous conditions in response to commands, communication or signals received from the hazardous condition identifier 2308. The hazardous condition identifier 2308 monitors or identifies potentially hazardous conditions during a landing event and/or a takeoff event. For example, the hazardous condition identifier 2308 communicates to the brake system monitor 2302 a first signal (e.g., an output signal of the binary bit "1") representative of an identified hazardous condition and a second signal (e.g., an output signal of the binary bit "0") representative of a hazardous condition not identified or not present.

To monitor for hazardous conditions, the hazardous condition identifier 2308 receives signals from the hazardous condition sensor 138 (e.g., LIDAR sensors) and the GPS sensor 140. Referring to FIG. 23B, the signal processor 2301 of the hazardous condition identifier 2308 processes the signal(s) from the hazardous condition sensor 138. For example, as noted above, the hazardous condition sensor 138 can include one or more LIDAR sensors, radar sensors, sonar sensors and/or high powered camera sensors that detect objects such as vehicles (e.g., aircraft), edges of the runway 144, etc. The signal processor 2301 receives the signals can converts the signals for processing by the map constructor 2303. The map constructor 2303 employs software to map an image corresponding to the environment surrounding the aircraft 100 when the aircraft 100 is on the runway 144. The GPS processor 2305 receives signals from the GPS sensor 140 and information from an inertial measurement unit (IMU) 2309 to determine geolocation information corresponding to the aircraft 100. The predictive modeler 2307 receives the imaged map provided by the map constructor 2303 and the geolocation information from the GPS processor 2305 to determine if a hazardous condition is imminent based on a location of the aircraft 100 relative to a detected hazard. For example, the predictive modeler 2307 can include hard coded rules, obstacle avoidance algorithms, smart object discrimination, and/or any other predictive modeling technique(s).

In some examples, to detect a potentially hazardous condition, the predictive modeler 2307 analyzes the imaged map from the map constructor 2303 to detect or identify an end of the runway 144 during a takeoff event or a landing event. If the predictive modeler 2307 detects the end of the runway 144, the predictive modeler 2307 retrieves aircraft speed from the airspeed determiner 2304 and/or the brake system monitor 2302, the weight on wheels signal from the weight on wheels determiner 2310, and/or an angle of attack of the aircraft 100 from the various parameters provided to the brake system monitor 2302 via the engine control system 132. For example, the predictive modeler 2307 determines a distance between the aircraft 100 and the end of the runway 144 (e.g., via the GPS processor 2305) and calculates a braking distance required to stop the aircraft 100 prior to reaching the end of the runway 144. If the predictive modeler 2307 determines that the aircraft 100 can stop within the given distance based on the aircraft speed provided by the airspeed determiner 2304 (e.g., which can also be used to determine a rate of deceleration during landing) and/or the aircraft 100 can take-off prior to reaching the end of the runway 144 based on the angle of attack, the predictive modeler 2307 determines that a hazardous condition is not present. If the angle of attack is not sufficient for takeoff and/or the airspeed of the aircraft 100 is such that the aircraft 100 cannot stop prior to the end of the runway 144, the predictive modeler 2307 identifies a hazardous condition and communicates a hazardous condition to the brake system monitor 2302.

In some examples, to determine a potentially hazardous condition, the predictive modeler 2307 analyzes the imaged map to determine a presence of an object (e.g., another aircraft) in a travel path of the aircraft 100. The predictive modeler 2307 obtains geolocation information from the GPS processor 2305 to determine a distance between the aircraft 100 and the identified object and obtains the airspeed of the aircraft 100 from the airspeed determiner 2304 and/or the brake system monitor 2302. If the distance between the aircraft 100 and the identified object is such that the aircraft 100 cannot avoid a collision with the identified object, the predictive modeler 2307 identifies a hazardous condition and communicates a hazardous condition signal to the brake system monitor 2302. If the distance between the aircraft 100 and the identified object is such that the aircraft 100 can avoid a collision with the identified object based on the distance and the airspeed information, the predictive modeler 2307 determines that a hazardous condition is not present and communicates a non-hazardous condition signal to the brake system monitor 2302.

Referring to FIG. 23A, the brake system monitor 2302 operates the air brake operator 2312, the parachute operator 2314 and/or the emergency brake operator 2316 in response to the signals received from the airspeed determiner 2304, the hazardous condition identifier 2308, the crosswind determiner 2306 and/or the landing event activator 2320. For example, the brake system monitor 2302 commands the air brake operator 2312 based on the signals received from the weight on wheels determiner 2310, the airspeed determiner 2304, the crosswind determiner 2306, and the landing event activator 2320. In some examples, the brake system controller 130 does not include the crosswind determiner 2306 and the brake system monitor 2302 commands the air brake operator 2312 based on the signals received from the weight on wheels determiner 2310, the airspeed determiner 2304 and the landing event activator 2320.

For example, the brake system monitor 2302 activates the air brake system 124 when the brake system monitor 2302 receives a signal from the landing event activator 2320 to monitor for a landing event, a signal from the weight on wheels determiner 2310 indicative that the aircraft 100 is on the surface 142 of the runway 144, a measured airspeed value from the airspeed determiner 2304, and a measured crosswind value from the crosswind determiner 2306.

The brake system monitor 2302 compares the measured speed from the airspeed determiner 2304 to a speed threshold (e.g., 60 knots). For example, the brake system monitor 2302 retrieves or obtains the speed threshold from the data store 2318 and employs the comparator 2322 to compare the measured airspeed value from the airspeed determiner 2304 and the speed threshold from the data store 2318. The speed threshold can be provided in the data store 2318 via a user input. Additionally, in some examples, brake system monitor 2302 compares, via the comparator 2322, the measured crosswind value to a crosswind threshold (e.g., 10 knots, 20 knots, etc.). For example, the brake system monitor 2302 retrieves or obtains the crosswind threshold from the data store 2318 and employs the comparator 2322 to compare the measured crosswind value from the crosswind determiner 2306 and the crosswind threshold from the data store 2318. The crosswind threshold can be provided in the data store 2318 via a user input.

When the crosswind determiner 2306 is not employed, the brake system monitor 2302 commands the air brake operator 2312 to deploy the first and second fan cowls 222, 224 of the respective aircraft engines 110, 112 in a synchronous deployment sequence. For example, the air brake operator 2312 can command the first actuator 234, the second actuator 236, the third actuator 244, and the fourth actuator 246 to simultaneously or substantially simultaneously (e.g., within a 10 seconds of each other) actuate or deploy the first and second fan cowls 222, 224 to the deployed position 204.

When the crosswind determiner 2306 is employed, the brake system monitor 2302 activates the air brake operator 2312 in response to the weight on wheels determiner 2310 detecting that the aircraft 100 is on the surface 142, the airspeed determiner 2304 detecting that the aircraft speed is greater than the speed threshold, and the crosswind determiner 2306 detecting that the crosswind is greater than the crosswind threshold. In some such examples, the brake system monitor 2302 commands the air brake operator 2312 to deploy the first and second fan cowls 222, 224 of the respective aircraft engines 110, 112 in an asynchronous deployment sequence. For example, the air brake operator 2312 can cause the first actuator 234 and the second actuator 236 of the aircraft engine 110, and the first actuator 234 and the second actuator 236 of the aircraft engine 112 to activate simultaneously to deploy the first fan cowls 222 of the respective aircraft engines 110, 112 (e.g., the inboard side fan cowls) prior to deployment of the second fan cowls 224 (e.g., the outboard side fan cowls). In some such examples, the brake system monitor 2302 continues to monitor the measured crosswind from the crosswind determiner 2306 and commands the air brake operator to deploy the second fan cowls 224 of the aircraft engines 110, 112 when the measured crosswind value is less than or equal to the crosswind threshold. In some such examples, the brake system monitor 2302 commands the air brake operator 2312 to activate the third actuator 244 and the fourth actuator 246 to deploy the second fan cowls 224 of the aircraft engines 110, 112.

When the first and second fan cowls 222, 224 are in the deployed position 204, the brake system monitor 2302 continues to monitor the measured airspeed of the aircraft 100 provided by the airspeed determiner 2304 to the speed threshold. The brake system monitor 2302 commands the air brake operator 2312 to move the first and second fan cowls 222, 224 from the deployed position 204 to the stowed position 202 when the brake system monitor 2302 determines that the airspeed the measured airspeed from the airspeed determiner 2304 is less than or equal to the speed threshold.

The brake system monitor 2302 activates the parachute operator 2314 in response to the weight on wheels determiner 2310 detecting that the aircraft 100 is on the surface 142 and the brake system monitor 2302 determining that the measured airspeed from the airspeed determiner 2304 is greater than the speed threshold. In response, the brake system monitor 2302 commands the parachute operator to 2314 to activate the parachute launching system 504 (e.g., the air injection system 402). For example, the parachute operator 2314 causes the door 406 to move to the open position 410, which causes the launch tube 510 to deploy the parachute 508. When the parachute 508 is in the deployed position 500, the brake system monitor 2302 continues to monitor the measured airspeed of the aircraft 100 provided by the airspeed determiner 2304. When the brake system monitor 2302 determines that the measured airspeed of the aircraft 100 is less than or equal to the speed threshold, the brake system monitor 2302 commands the parachute operator 2314 to activate the parachute retrieval system 506. In some examples, the parachute operator 2314 activates the motor 556 for a predetermined period of time and/or until the parachute operator 2314 and/or the brake system monitor 2302 receives a signal from an encoder or proximity switch indicative of the parachute 508 being in the stowed position 502.

The brake system monitor 2302 activates the emergency brake operator 2316 in response to the weight on wheels determiner 2310 detecting that the aircraft 100 is on the surface 142 and the hazardous condition identifier 2308 determining that a hazardous condition is present. In response, the brake system monitor 2302 commands cover actuator 2005 to actuate to remove the cover 2003 from the emergency brake system 128 and cause the emergency brake system 128 to move from the stowed position 2001 to the deployed position 2000. Additionally, the brake system monitor 2302 commands the emergency brake operator 2316 to actuate or activate the emergency brake actuators 2012 to generate a vacuum on the brake pad 2004 when the brake pad 2004 is on the surface 142. In some examples, prior to deploying the emergency brake system 128, the brake system monitor 2302 commands an alarm generator 2346 to generate an alarm in a passenger cabin of the aircraft 100. The alarm provides warning to passengers so that the passengers can move to a brace position.

While an example manner of implementing the brake system controller 130 of FIG. 1 is illustrated in FIGS. 23A and 23B, one or more of the elements, processes and/or devices illustrated in FIGS. 23A and 23B may be combined, divided, re-arranged, omitted, eliminated and/or implemented in any other way. Further, the example brake system monitor 2302, the example airspeed determiner 2304, the example crosswind determiner 2306, the example hazardous condition identifier 2308, the example weight on wheels determiner 2310, the example air brake operator 2312, the example parachute operator 2314, the example emergency brake operator 2316, the example data store 2318, the landing event activator 2320, the example comparator 2322, the example signal processor 2301, the example map constructor 2303, the example GPS processor 2305, the example predictive modeler 2307, the example inertial measurement unit 2309 and/or, more generally, the example brake system controller 130 of FIGS. 1, 23A and 23B may be implemented by hardware, software, firmware and/or any combination of hardware, software and/or firmware. Thus, for example, any of the example brake system monitor 2302, the example airspeed determiner 2304, the example crosswind determiner 2306, the example hazardous condition identifier 2308, the example weight on wheels determiner 2310, the example air brake operator 2312, the example parachute operator 2314, the example emergency brake operator 2316, the example data store 2318, the landing event activator 2320, the example comparator 2322, the example signal processor 2301, the example map constructor 2303, the example GPS processor 2305, the example predictive modeler 2307, the example inertial measurement unit 2309 and/or, more generally, the example brake system controller 130 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example brake system monitor 2302, the example airspeed determiner 2304, the example crosswind determiner 2306, the example hazardous condition identifier 2308, the example weight on wheels determiner 2310, the example air brake operator 2312, the example parachute operator 2314, the example emergency brake operator 2316, the example data store 2318, the landing event activator 2320, the example comparator 2322, the example signal processor 2301, the example map constructor 2303, the example GPS processor 2305, the example predictive modeler 2307, the example inertial measurement unit 2309 is/are hereby expressly defined to include a non-transitory computer readable storage device or storage disk such as a memory, a digital versatile disk (DVD), a compact disk (CD), a Blu-ray disk, etc. including the software and/or firmware. Further still, the example brake system controller 130 of FIG. 1 may include one or more elements, processes and/or devices in addition to, or instead of, those illustrated in FIGS. 23A and 23B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events Flowcharts representative of example methods 2400-2700 for implementing the brake system controller 130 of FIGS. 1, 23A and 23B is shown in FIGS. 24-27. The flowcharts are representative of hardware logic, machine readable instructions, hardware implemented state machines, and/or any combination thereof for implementing the brake system controller 130 of FIG. 1. The machine readable instructions may be an executable program or portion of an executable program for execution by a computer processor such as the processor 2712 shown in the example processor platform 2700 discussed below in connection with FIG. 27. The program may be embodied in software stored on a non-transitory computer readable storage medium such as a CD-ROM, a floppy disk, a hard drive, a DVD, a Blu-ray disk, or a memory associated with the processor 2712, but the entire program and/or parts thereof could alternatively be executed by a device other than the processor 2712 and/or embodied in firmware or dedicated hardware. Further, although the example program is described with reference to the flowcharts illustrated in FIGS. 24-26, many other methods of implementing the example brake system controller 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 24-26 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 24:
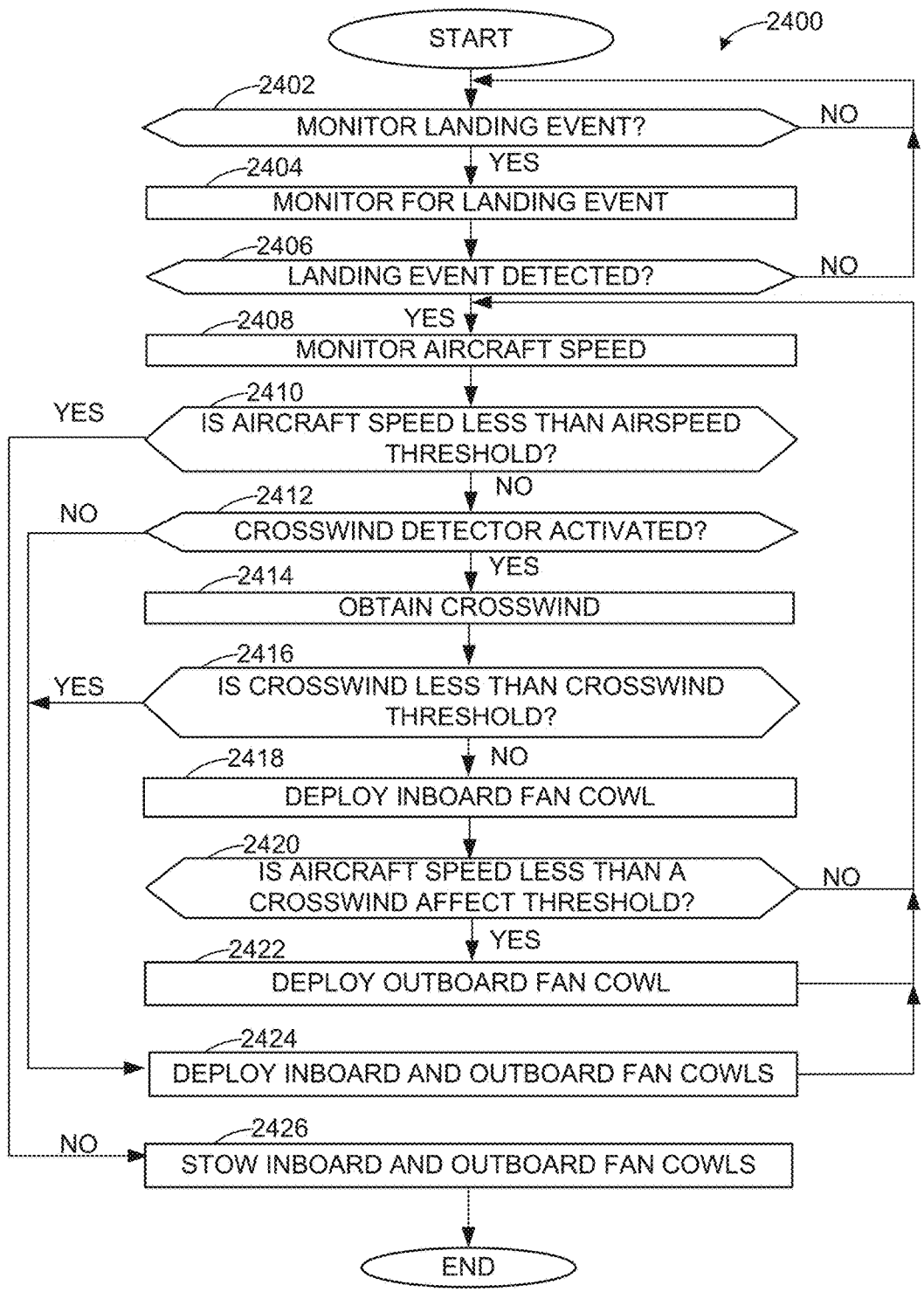
FIGS. 24-26 are flowcharts representative of example methods that may be performed to implement the example brake system controller of FIGS. 23A and 23B.

Referring to FIG. 24, the method 2400 begins when the brake system monitor 2302 determines whether to monitor for a landing event (block 2402). If at block 2402 the brake system monitor 2302 receives a signal from the landing event activator 2320 to not monitor for a landing event, the brake system monitor 2302 determines not to monitor for a landing event and the process returns to block 2402.

If at block 2402 the brake system monitor 2302 receives a signal from the landing event activator 2320 to monitor for a landing event, the brake system monitor 2302 monitors for a landing event (block 2404).

The brake system monitor 2302 determines if a landing event is detected (block 2406). For example, the brake system monitor 2302 receives information from the weight on wheels determiner 2310 to detect if the aircraft 100 is in flight or on the surface 142. If at block 2406 the weight on wheels determiner 2310 communicates a first signal to the brake system monitor 2302 representative of the aircraft 100 in flight, the brake system monitor 2302 determines that a landing event has not occurred, and the process returns to block 2402.

If at block 2406 the weight on wheels determiner 2310 communicates a second signal to the brake system monitor 2302 representative of the aircraft 100 in contact with the surface 142, then the brake system monitor 2302 determines that a landing event is detected and monitors the aircraft speed (block 2408).

For example, the brake system controller 130 receives a measured airspeed value from the airspeed determiner 2304 and compares the measured airspeed value to an airspeed threshold to determine if the measured airspeed value is less than the speed threshold (block 2410).

If at block 2410 the brake system monitor 2302 determines that the measured airspeed value is greater than the airspeed threshold, the brake system monitor 2302 detects if a crosswind determiner 2306 is activated (block 2412).

If at block 2412 the brake system monitor 2302 determines that the crosswind determiner 2306 is activated, the brake system monitor 2302 obtains the crosswind value from the crosswind determiner 2306 (block 2414).

The brake system monitor 2302 determines if the crosswind value is less than a crosswind threshold (block 2416). For example, the brake system monitor 2302 compares, via the comparator 2322, the crosswind value and the crosswind threshold.

If at block 2416 the brake system monitor 2302 determines that the crosswind value is not less than the crosswind threshold, the air brake operator 2312 causes the inboard fan cowls 222 of the respective aircraft engines 110, 112 to move to the deployed position 204 (block 2418). In some such examples, only the first and second actuators 234, 236 are actuated to an extended position to deploy the inboard fan cowls 222.

After the inboard fan cowls 222 are moved to the deployed position 204, the brake system monitor 2302 compares the next measured aircraft speed to a crosswind affect threshold (block 2420). For example, during crosswind conditions, crosswinds may not impact aircraft performance when the airspeed is less than the crosswind affect threshold value (e.g., 70 knots). If at block 2420 the brake system monitor 2302 determines that the measured airspeed value is not less than the crosswind affect threshold, the process returns to block 2408.

If at block 2420 the brake system monitor 2302 determines that the airspeed value is less than the crosswind affect threshold, the air brake operator 2312 deploys the outboard fan cowls 224 of the respective aircraft engines 110, 112 (block 2422). The process returns to block 2408.

If at block 2412 the brake system monitor 2302 determines that the crosswind determiner 2306 is not activated and/or if at block 2416 the brake system monitor 2302 determines that the crosswind value is less than the crosswind threshold, the brake system monitor 2302 commands the air brake operator 2312 to move the inboard and outboard fan cowls 222, 224 to the deployed position 204 (block 2424). For example, the brake system monitor 2302 commands the air brake operator 2312 to deploy (e.g., simultaneously) the inboard and outboard fan cowls 222, 224 using a synchronous deployment sequence. The process then returns to block 2408.

If at block 2410 the brake system controller 130 determines that the measured airspeed value is not greater than the speed threshold, the brake system controller 130 commands the air brake operator 2312 to stow the inboard and outboard fan cowls 222, 224 (block 2426). For example, the airspeed threshold may be an airspeed at which the air brake system 124 is not effective to reduce aircraft speed. In some examples, the airspeed threshold is between approximately 50 knots and 60 knots. In some examples, the airspeed threshold is zero knots.

Figure 25:
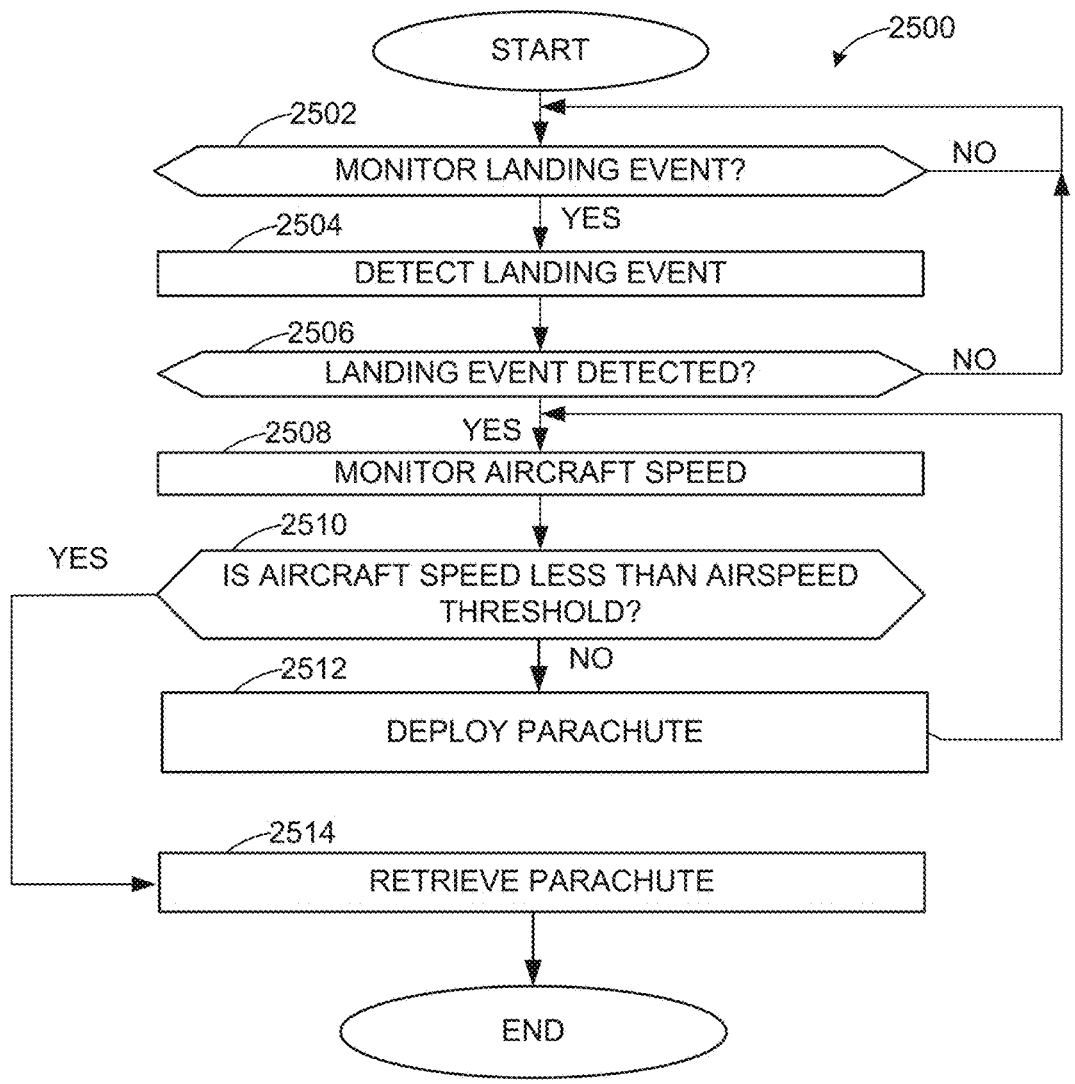

Referring to FIG. 25, the method 2500 begins when the brake system monitor 2302 determines whether to monitor for a landing event (block 2502). If at block 2502 the brake system monitor 2302 receives a signal from the landing event activator 2320 to not monitor for a landing event, the brake system monitor 2302 determines not to monitor for a landing event and the process returns to block 2502.

If at block 2502 the brake system monitor 2302 receives a signal from the landing event activator 2320 to monitor for a landing event, the brake system monitor 2302 monitors for detection of a landing event (block 2504).

The brake system monitor 2302 determines if a landing event is detected (block 2506). For example, the brake system monitor 2302 receives information from the weight on wheels determiner 2310 to detect if the aircraft 100 is in flight or on the surface 142. If at block 2506 the weight on wheels determiner 2310 communicates a first signal to the brake system monitor 2302 representative of the aircraft 100 in flight, the brake system monitor 2302 determines that a landing event has not occurred, and the process returns to block 2502.

If at block 2506 the weight on wheels determiner 2310 communicates a second signal to the brake system monitor 2302 representative of the aircraft 100 being in contact with the surface 142, then the brake system monitor 2302 determines that a landing event is detected and monitors the aircraft speed (block 2508).

To monitor the aircraft speed, the brake system controller 130 receives a measured airspeed value from the airspeed determiner 2304 and compares the measured airspeed value to an airspeed threshold to determine if the measured airspeed value is less than the airspeed threshold (block 2510).

If at block 2510 the brake system monitor 2302 determines that the measured airspeed value is greater than the airspeed threshold, the brake system monitor 2302 deploys the parachute (block 2512). For example, the brake system monitor 2302 causes the parachute operator 2314 to activate the parachute launching system 504. For example, the parachute operator 2314 activates the air injection system 402 by commanding the door 406 to move to the open position 410. The process returns to block 2508.

If at block 2510 the brake system controller 130 determines that the measured airspeed value is not greater than the speed threshold, the brake system controller 130 commands the parachute operator 2314 to retrieve the parachute 508 (block 2514). For example, to retrieve the parachute 508, the parachute operator 2314 activates the parachute retrieval system 506 by commanding the motor 556 to rotate the reel 530 in the wind direction.

Figure 26:
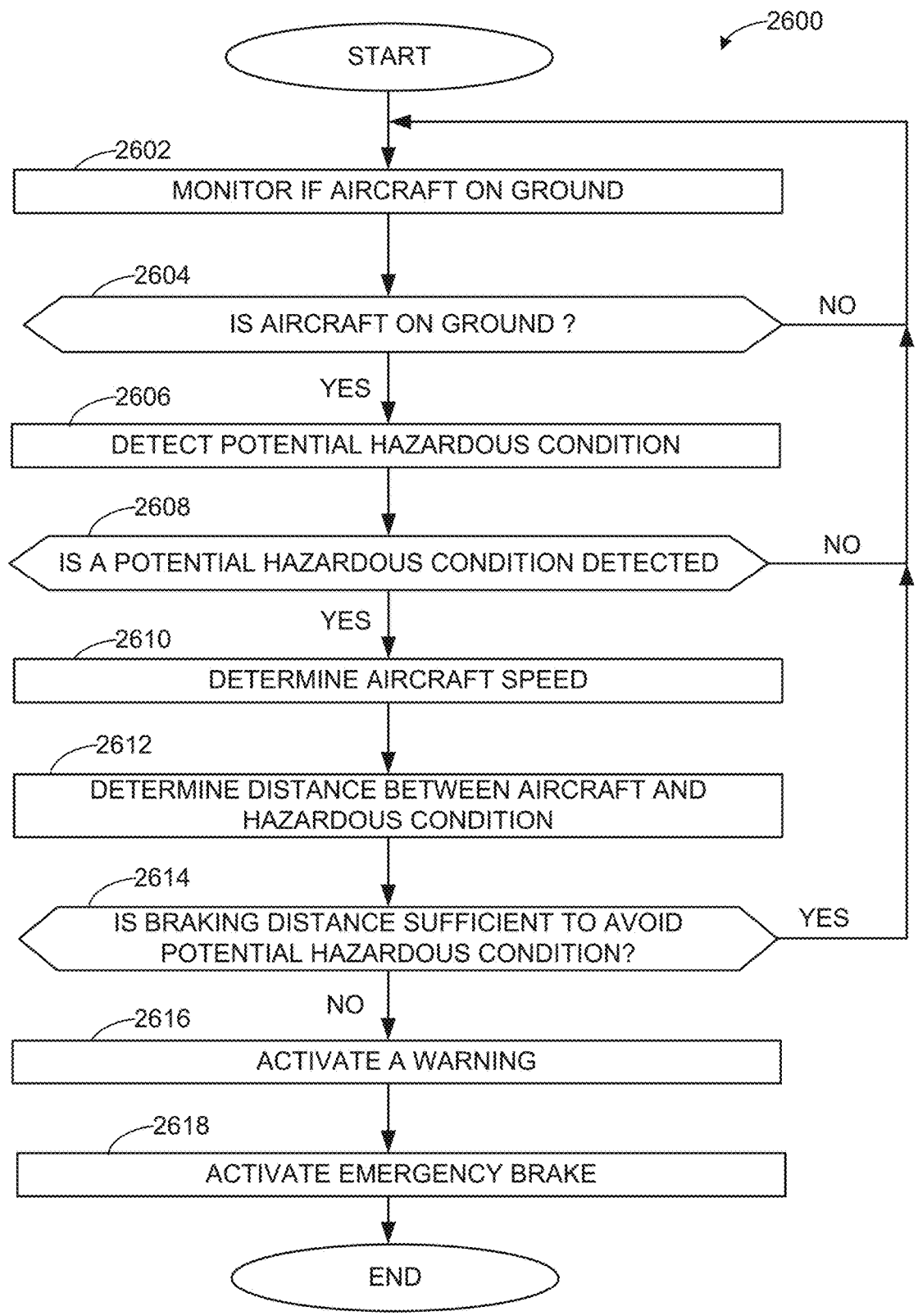

Referring to FIG. 26, the method 2600 begins when the brake system controller 130 detects whether the aircraft 100 is on the surface 142 (block 2602). For example, the brake system monitor 2302 receives signals from the weight on wheels determiner 2310 to determine if the aircraft 100 is in flight or on the surface 142.

If a potentially hazardous condition is not detected (block 2608), the process returns to block 2602. If a potentially hazardous condition is detected (block 2608), the hazardous condition identifier 2308 determines the aircraft speed (block 2610). For example, the hazardous condition identifier 2308 receives the aircraft speed from the airspeed determiner 2304.

The hazardous condition identifier 2308 determines a distance between the aircraft 100 and a hazardous condition (block 2612). The hazardous condition identifier 2308 determines if a braking distance is sufficient to avoid the identified hazardous condition (block 2614). If at block 2614 the braking distance is sufficient to avoid the potentially hazardous condition, the process returns to block 2602. If at block 2614 the braking distance is not sufficient to avoid the potentially hazardous condition, the brake system monitor 2302 activates a warning (block 2616) and activates the emergency brake (block 2618). For example, the emergency brake operator 2316 commands or otherwise causes the alarm generator 2346 to activate and initiate an alarm. For example, the alarm is initiated in the fuselage 104 to warn passengers to move to a brace position because the emergency brake system 128 is going to activate within, for example, a predetermined time frame (e.g., 20 seconds).

After expiration of the predetermined time frame, the emergency brake operator 2316 activates the cover actuator 2005 to deploy the brake pad 2004 and activates the emergency brake actuators 2012 to provide a vacuum or seal about the peripheral edge 2004a of the brake pad 2004.

Figure 27:
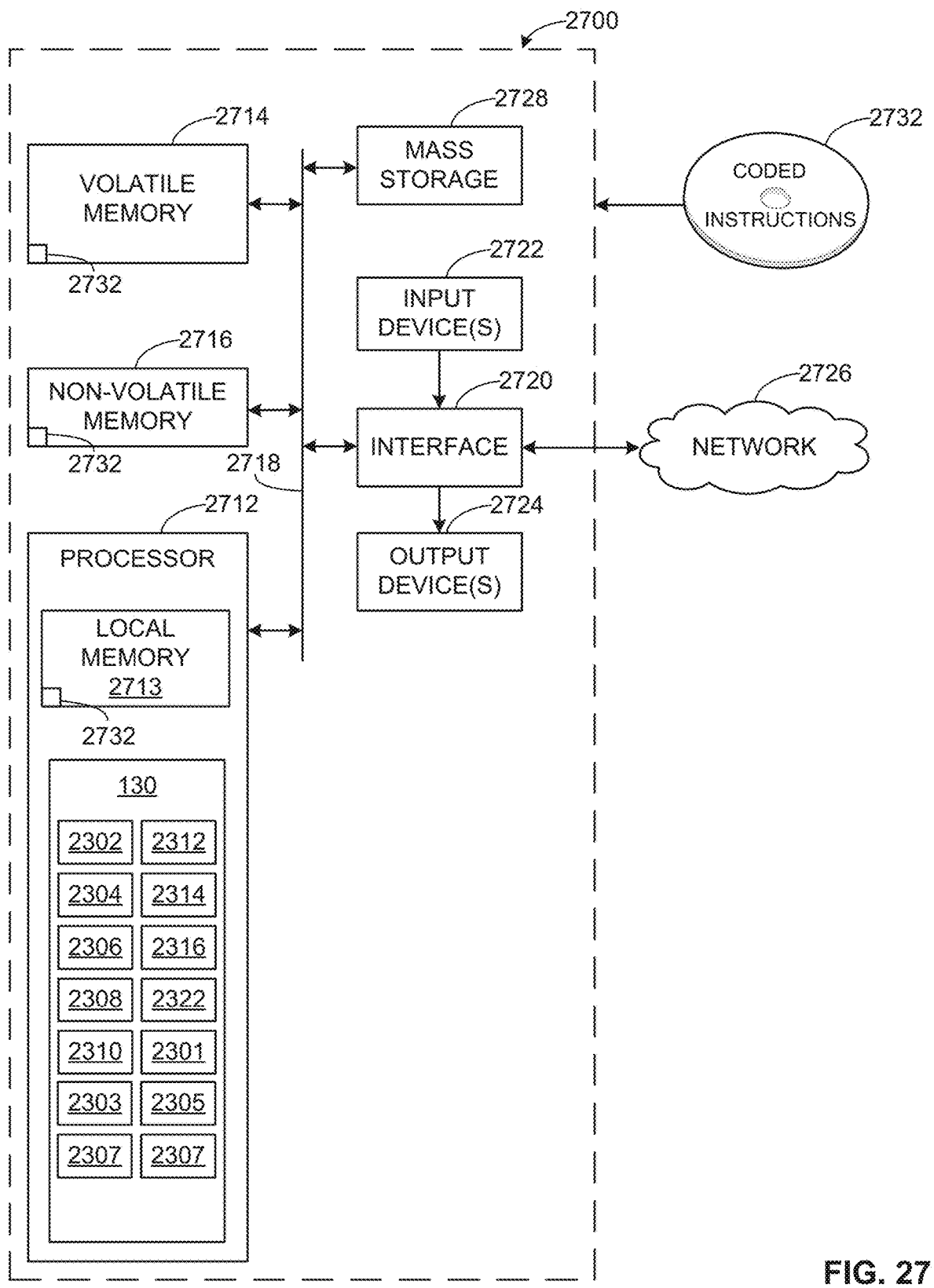
FIG. 27 is a block diagram of an example processor platform capable of executing instructions to implement the methods of FIGS. 24-26 and the example brake system controller 130 of FIGS. 1, 23A and 23B.

FIG. 27 is a block diagram of an example processor platform 2700 structured to execute the instructions of FIGS. 24-26 to implement the brake system controller 130 of FIGS. 23A and 23B. The processor platform 2700 can be, for example, a server, a personal computer, a workstation, an Internet appliance, or any other type of computing device.

The processor platform 2700 of the illustrated example includes a processor 2712. The processor 2712 of the illustrated example is hardware. For example, the processor 2712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example brake system monitor 2302, the example airspeed determiner 2304, the example crosswind determiner 2306, the example hazardous condition identifier 2308, the example weight on wheels determiner 2310, the example air brake operator 2312, the example parachute operator 2314, the example emergency brake operator 2316, the example data store 2318, the landing event activator 2320, the example comparator 2322, the example signal processor 2301, the example map constructor 2303, the example GPS processor 2305, the example predictive modeler 2307, the example inertial measurement unit 2309 and/or, more generally, the example brake system controller 130 of FIGS. 1, 23A and 23B.

The processor 2712 of the illustrated example includes a local memory 2713 (e.g., a cache). The processor 2712 of the illustrated example is in communication with a main memory including a volatile memory 2714 and a non-volatile memory 2716 via a bus 2718. The volatile memory 2714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2716 may be implemented by flash memory and/or any other desired type of memory device. Access to the main memory 2714, 2716 is controlled by a memory controller.

The processor platform 2700 of the illustrated example also includes an interface circuit 2720. The interface circuit 2720 may be implemented by any type of interface standard, such as an Ethernet interface, a universal serial bus (USB), a Bluetooth® interface, a near field communication (NFC) interface, and/or a PCI express interface.

In the illustrated example, one or more input devices 2722 are connected to the interface circuit 2720. The input device(s) 2722 permit(s) a user to enter data and/or commands into the processor 2712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2724 are also connected to the interface circuit 2720 of the illustrated example. The output devices 2724 can be implemented, for example, by display devices (e.g., a light emitting diode (LED), an organic light emitting diode (OLED), a liquid crystal display (LCD), a cathode ray tube display (CRT), and/or an in-place switching (IPS) display, a touchscreen, etc.). The interface circuit 2720 of the illustrated example, thus, typically includes a graphics driver card, a graphics driver chip and/or a graphics driver processor.

The interface circuit 2720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2700 of the illustrated example also includes one or more mass storage devices 2728 for storing software and/or data. Examples of such mass storage devices 2728 include floppy disk drives, hard drive disks, compact disk drives, Blu-ray disk drives, redundant array of independent disks (RAID) systems, and digital versatile disk (DVD) drives.

The machine executable instructions 2732 of FIGS. 24-26 may be stored in the mass storage device 2728, in the volatile memory 2714, in the non-volatile memory 2716, and/or on a removable non-transitory computer readable storage medium such as a CD or DVD.

The following paragraphs provide various examples of the example wayfinding apparatus disclosed herein.

In some examples, a braking system for an aircraft includes a fan cowl having a leading edge and a trailing edge. The braking system includes a hinge assembly coupled between the leading edge and a fan cage of an aircraft engine to enable the fan cowl to move between a stowed position and a deployed position. An actuator is coupled to the leading edge of the fan cowl, and the actuator is to move the fan cowl via the hinge from the stowed position to the deployed position in a direction away from the aircraft engine and toward a fore end of the aircraft to provide an air brake during a braking event.

In some examples, a kicker plate protrudes from the trailing edge of the fan cowl.

In some examples, the kicker plate is pivotally coupled relative to the trailing edge of the fan cowl.

In some examples, a chine located at a lateral edge of the fan cowl between the leading edge and the trailing edge.

In some examples, the braking system further includes a variable pitch fan, the variable pitch fan operable to provide braking force for the aircraft.

In some examples, the fan cowl is configured to provide access to the variable pitch fan during a maintenance operation.

In some examples, the braking system further includes a variable pitch gear driven fan.

In some examples, a braking system for an aircraft, the braking system includes an aircraft engine, a first fan cowl movably coupled to an inboard side of the aircraft engine, and a second fan cowl movably coupled to an outboard side of the aircraft engine. Each of the first and second fan cowls are movable between a stowed position and a deployed position. The first and second fan cowls rotate outwardly relative to the aircraft engine into an airflow stream in the deployed position to increase drag and provide an air brake to reduce a speed of the aircraft during at least a portion of a landing event.

The system of claim 8, wherein the first and second fan cowls are substantially perpendicular to the airflow stream when the first and second fan cowls are in the deployed position and substantially parallel to the airflow stream when the fan cowl is in the stowed position.

In some examples, the first and second fan cowls provide an aerodynamic engine cowl surface when the first and second fan cowls are in the stowed position.

In some examples, the first and second fan cowls to increase drag when the first and second fan cowls are in the deployed position relative to when the first and second fan cowls are in the stowed position.

In some examples, a first hinge to pivotally couple the fan cowl to the aircraft engine and a second hinge to pivotally couple the second fan cowl to the aircraft engine.

In some examples, the aircraft engine includes a variable pitch fan to provide reverse thrust during the landing event.

In some examples, the first fan cowl is movable between the stowed position and deployed position independently from the second fan cowl.

In some examples, the system includes a controller to: detect a landing event; determine a speed of the aircraft; compare the speed of the aircraft to a speed threshold; and deploy the first fan cowl and the second fan cowl in response to the determined speed being within the speed threshold.

In some examples, the controller is to: detect a landing event;
determine a first speed of the aircraft; compare the first speed of the aircraft to a first speed threshold; determine a crosswind vector; and compare the crosswind vector to a crosswind vector threshold.

In some examples, the controller is to deploy the first fan cowl and the second fan cowl simultaneously in response to the crosswind vector being less than the crosswind vector threshold and the determined first speed is less than the first speed threshold.

In some examples, the controller is to deploy the first fan cowl to the deployed position in response to the crosswind vector is greater than the crosswind vector threshold and the determined first speed is less than the first speed threshold.

In some examples, the controller is to: determine a second speed of the aircraft after the first fan cowl is moved to the deployed position; compare the second speed of the aircraft to a second speed threshold; and move the second fan cowl to the deployed position in response to determining that the determined second speed is less than the second speed threshold.

In some examples, a method for braking an aircraft includes: detecting a landing event; determining a speed of the aircraft; and moving a first fan cowl from a stowed position to a deployed position into an airflow stream to increase drag and reduce the speed of the aircraft when the determined speed is less than a speed threshold.

In some examples, the method includes rotating a second fan cowl from a stowed position to a deployed position into the airflow stream to increase drag and reduce the speed of the aircraft when the determined speed is less than the speed threshold.

In some examples, the method includes moving the first and second fan cowls to the respective deployed positions simultaneously.

In some examples, a braking system for an aircraft includes a parachute launching system configured to deploy a parachute from a stowed position within a launch tube of the parachute launching system to a deployed position in an airstream of the aircraft. The braking system includes a parachute retrieval system including a first cable configured to recover the parachute from the deployed position to the stowed position for subsequent use.

In some examples, the launch tube includes a passageway between a first end of the launch tube and a second end of the launch tube to receive the parachute when the parachute is in the stowed position.

In some examples, the parachute launching system includes an air injection system to deploy the parachute.

In some examples, the air injection system includes a pipe to direct airflow from atmosphere through the passageway of the launch tube.

In some examples, the air injection system includes a door formed on the fuselage and movable between an open position to allow pressurized air to flow to the launch tube and a closed position to prevent pressurized air to flow to the launch tube.

In some examples, the parachute retrieval system includes a reel configured to pull the parachute from the deployed position to the stowed position through the passageway of the launch tube via the first cable.

In some examples, the first cable has a first end coupled to an inner surface of an apex of the parachute and a second end opposite the first end coupled to the reel.

In some examples, the first cable is to pass through the passageway of the launch tube.

In some examples, a second cable having a third end coupled to the reel and a fourth end coupled to a peripheral edge of the parachute.

In some examples, the second cable is positioned outside of the passageway of the launch tube.

In some examples, a portion of the fourth end of the second cable is positioned in the passageway of the launch tube when the parachute is in the stowed position.

In some examples, the fourth end of the second cable is positioned in the second end of the launch tube.

In some examples, a system includes a first tube and a second tube slidably coupled within the first tube between a stowed position and a deployed position. A parachute is positioned in the second tube. An air injection system to provide pressurized air in the second tube when the second tube is in the deployed position, where the pressurized air is to cause the parachute to deploy from the second tube. A parachute retrieval system to pull the parachute into the second tube for subsequent use.

In some examples, a drive is coupled to the second tube. The drive to move the second tube between the stowed position and the deployed position.

In some examples, the parachute retrieval system includes a reel.

In some examples, a plurality of cables, respective first ends of the cables to couple to the parachute and respective second ends of the cables to couple to the reel.

In some examples, the reel is to wind the cables to pull the parachute into the second tube.

In some examples, a method for braking an aircraft includes: ejecting a parachute via a launch tube from an empennage of an aircraft to unfurl the parachute in an airstream of the aircraft; retrieving the parachute via a retrieval system; and repacking the parachute in the launch tube via the retrieval system for subsequent use.

In some examples, the retrieving of the parachute includes activating a reel to wind a cable attached to the parachute.

In some examples, the repacking the parachute includes pulling the parachute into the launch tube via the cable when the reel winds the cable.

In some examples, a braking system for an aircraft includes a brake pad movably coupled to a lower section of a fuselage of the aircraft. The brake pad is movable between a stowed position and a deployed position. An actuator is configured to deploy the brake pad from the fuselage during an emergency braking event. The brake pad is to engage a surface of a runway and increase frictional force to reduce a speed of the aircraft during the emergency braking event.

In some examples, a sled pivotally coupled to the fuselage via one or more links, where the sled is to support the brake pad.

In some examples, the brake pad includes a plurality of openings and a plurality of suction generators, each of the suction generators in fluid communication with a respective one of the openings.

In some examples, the suction generators are to provide a suction force through the openings to maintain the brake pad in engagement with the surface of the runway during the emergency braking event.

In some examples, the suction force is to cause a peripheral edge of the brake pad to seal against the surface of the runway when the brake pad is in engagement with the runway during the emergency braking event.

In some examples, the system includes a controller to: identify a hazardous condition; determine a braking distance required to avoid the hazardous condition based on at least one of a measured speed of the aircraft or a deceleration of the aircraft; and in response to determining that the braking distance is insufficient to avoid the hazardous condition, command the actuator to deploy the emergency brake pad and activate the suction generators.

In some examples, the hazardous condition includes at least one of an end of the runway or an object.

In some examples, the braking system further includes a variable pitch fan, the variable pitch fan operable to provide braking force for the aircraft.

In some examples, the emergency braking event includes at least one of a landing event or a failed take-off attempt.

In some examples, the brake system is to generate between approximately 4 g-force and 5 g-force of negative thrust during the emergency braking event.

In some examples, a braking system for an aircraft includes a housing, a braking device carried by the housing, a link to pivotally couple the housing to a fuselage, and a suction generator to generate a vacuum within a peripheral boundary of the braking device when the braking device is in engagement with a surface of a runway.

In some examples, an actuator is to move the braking device from a stowed position to a deployed position.

In some examples, an airfoil carried by at least one of the link or the housing, the airfoil to generate a downward force on the braking device when the braking device is in a deployed position.

In some examples, the suction generator is to generate a vacuum within a perimeter of the braking device to maintain the braking device in engagement with the runway when the braking device is in a deployed position.

In some examples, an area of the braking device is approximately 100 square feet.

In some examples, the braking device includes a plurality of brake pads.

In some examples, the braking device is capable of generating up to 5 g-force of negative thrust during an emergency braking event.

In some examples, a method for stopping an aircraft includes: identifying a hazardous condition; determining a braking distance required to avoid the hazardous condition based on at least one of a measured speed of the aircraft or a deceleration of the aircraft; and in response to determining that the braking distance is insufficient to avoid the identified hazardous condition, deploying an emergency brake pad.

In some examples, the method includes activating a suction generator after deploying the emergency brake pad.

In some examples, the method includes deploying the emergency brake includes operating an actuator to cause the brake pad to pivot from a lower surface of a fuselage of the aircraft from a stowed position to a deployed position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft comprising:
   a fuselage having a cavity housing an emergency braking system, the emergency braking system including:
   a brake pad having a plurality of openings, the brake pad movably coupled to a lower section of the fuselage, the brake pad movable between a stowed position and a deployed position relative to the fuselage;
   an actuator to pivotally couple the brake pad and the fuselage, the actuator configured to deploy the brake pad from the fuselage during an emergency braking event of the aircraft the brake pad structured to engage a surface of a runway and increase frictional force to reduce a speed of the aircraft during the emergency braking event;
   a plurality of suction generators, each of the suction generators in fluid communication with a respective one of the openings, the suction generators to provide a suction force through the openings to maintain the brake pad in engagement with the surface of the runway during the emergency braking event; and
   a brake system controller to:
      identify a hazardous condition;
      determine a braking distance required to avoid the hazardous condition based on at least one of a measured speed of the aircraft or a deceleration of the aircraft; and
      in response to determining that the braking distance is insufficient to avoid the hazardous condition, command the actuator to deploy the brake pad and activate the suction generators.

2. The aircraft of claim 1, further including a sled pivotally coupled to the fuselage via one or more links, the sled to support the brake pad.

3. The aircraft of claim 1, wherein the suction force is to cause a peripheral edge of the brake pad to seal against the surface of the runway when the brake pad is in engagement with the runway during the emergency braking event.

4. The aircraft of claim 1, wherein the hazardous condition includes at least one of an end of the runway or an object.

5. The aircraft of claim 1, wherein the braking system further includes a variable pitch fan, the variable pitch fan operable to provide braking force for the aircraft.

6. The aircraft of claim 1, wherein the brake system controller identifies a hazardous condition present during a braking event, the braking event including at least one of a landing event or a failed take-off attempt.

7. The aircraft of claim 1, wherein the braking system is to generate up to 5 g-force of negative thrust during the emergency braking event.

8. The aircraft of claim 1, further including an alarm generator to generate an alarm in a passenger cabin of the aircraft indicating that the emergency braking system is to deploy.

9. An aircraft comprising:
   a fuselage; and
   an emergency brake system positioned in a lower surface of the fuselage, the emergency brake system including;
   a housing;
   a brake carried by the housing and extending proximate a front landing gear and at least partially between a left rear landing gear and a right rear landing gear;
   a link to pivotally couple the housing to a frame of the fuselage;
   a suction generator to generate a vacuum within a peripheral boundary of the brake when the brake is in engagement with a surface of a runway, the fuselage defining a cavity to house the brake when the brake is in a stowed position, the brake to project from a cavity of the fuselage when the brake is in a deployed position;
   a cover positioned over the brake and at least a portion of an exterior surface of the fuselage to cover the brake when the brake is in the stowed position, the cover to completely detach from the fuselage when the brake moves to the deployed position; and
   a brake system controller including a hazardous condition identifier, the brake system controller to deploy the brake in response to the hazardous condition identifier detecting a hazardous condition.

10. The aircraft of claim 9, further including an actuator to move the brake from the stowed position to the deployed position.

11. The aircraft of claim 9, further including an airfoil carried by at least one of the link or the housing, the airfoil to generate a downward force on the brake when the brake is in a deployed position.

12. The aircraft of claim 9, wherein the suction generator is to generate a vacuum within a perimeter of the brake to maintain the brake in engagement with the runway when the brake is in a deployed position.

13. The aircraft of claim 9, wherein an area of the brake is approximately 100 square feet.

14. The aircraft of claim 9, wherein the brake includes a plurality of brake pads.

15. The aircraft of claim 9, wherein the brake generates up to 5 g-force of negative thrust during an emergency braking event.

16. The aircraft of claim 9, wherein the hazardous condition identifier is to detect the hazardous condition by:
   determining a braking distance required to avoid the hazardous condition based on at least one of a measured speed of the aircraft or a deceleration of the aircraft; and
   in response to determining that the braking distance is insufficient to avoid the identified hazardous condition, deploy the brake.

17. The aircraft of claim 16, wherein the controller is to activate the suction generator after deploying the brake.

18. The aircraft of claim 17, wherein the controller is to operate an actuator to cause the brake to pivot from a lower surface of a fuselage of the aircraft from a stowed position to a deployed position.

19. An aircraft comprising:
   a fuselage;
   landing gear carried by the fuselage;
   an emergency brake system carried by the fuselage and positioned between the landing gear, the emergency brake system positioned within the fuselage when the emergency brake system is in a stowed condition, the emergency brake system to project from the fuselage when the emergency brake system is in a deployed condition to engage a surface of a runway during an emergency braking event, the brake system including:

a housing;

a brake pad carried by the housing, the brake pad having raised surfaces to increase friction with the surface of the runway during the emergency braking event;

a link pivotally coupling the housing to a frame of the fuselage;

a suction generator to generate a vacuum within a peripheral boundary of the brake pad when the brake pad is in engagement with the surface of the runway;

a door coupled to the fuselage, the door positioned at a belly portion of the fuselage between the landing gear, the door to act as a cover for the braking system, the door to move to a closed position to cover the brake pad when the emergency brake system is in the stowed position and an open position to uncover the brake pad when the emergency brake system is in the deployed position; and a brake system controller to:
 identify a hazardous condition;
 determine a braking distance required to avoid the hazardous condition based on at least one of a measured speed of the aircraft or a deceleration of the aircraft; and
 in response to determining that the braking distance is insufficient to avoid the hazardous condition, command the actuator to deploy the emergency brake pad and activate the suction generators.

20. The aircraft of claim 19, further including an airfoil carried by at least one of the link or the housing, the airfoil to generate a downward force on the brake pad when the brake pad is in a deployed position.

* * * * *